(12) United States Patent
Kojima

(10) Patent No.: US 11,993,150 B2
(45) Date of Patent: May 28, 2024

(54) ANTI-VIBRATION DEVICE

(71) Applicant: Prospira Corporation, Kawasaki (JP)

(72) Inventor: Hiroshi Kojima, Tokyo (JP)

(73) Assignee: Prospira Corporation, Kawasaki (JP)

( * ) Notice: Subject to any disclaimer, the term of this patent is extended or adjusted under 35 U.S.C. 154(b) by 402 days.

(21) Appl. No.: 17/603,382

(22) PCT Filed: Jan. 31, 2020

(86) PCT No.: PCT/JP2020/003722
§ 371 (c)(1),
(2) Date: Oct. 13, 2021

(87) PCT Pub. No.: WO2020/213225
PCT Pub. Date: Oct. 22, 2020

(65) Prior Publication Data
US 2022/0176793 A1 Jun. 9, 2022

(30) Foreign Application Priority Data
Apr. 17, 2019 (JP) ................................. 2019-078794

(51) Int. Cl.
*F16F 13/08* (2006.01)
*B60K 5/12* (2006.01)
*F16F 13/10* (2006.01)

(52) U.S. Cl.
CPC .......... *B60K 5/1283* (2013.01); *F16F 13/105* (2013.01); *F16F 13/107* (2013.01)

(58) Field of Classification Search
CPC .... F16F 13/105; F16F 13/107; B60K 5/1208; B60K 5/1283
See application file for complete search history.

(56) References Cited

U.S. PATENT DOCUMENTS

| 6,257,562 B1* | 7/2001 | Takashima | ............ | F16F 13/105 |
| | | | | 267/141.1 |
| 2005/0189686 A1* | 9/2005 | Andou | ................. | F16F 13/105 |
| | | | | 267/140.13 |

(Continued)

FOREIGN PATENT DOCUMENTS

| JP | 2007-085523 A | 4/2007 |
| JP | 2009-052696 A | 3/2009 |

(Continued)

OTHER PUBLICATIONS

International Search Report for PCT/JP2020/003722 dated Apr. 7, 2020 (PCT/ISA/210).

(Continued)

*Primary Examiner* — Bradley T King
(74) *Attorney, Agent, or Firm* — KENJA IP LAW PC

(57) ABSTRACT

A partition member (17) of an anti-vibration device (1, 2, 3, 4) includes a membrane (31) and an orifice passage (21), the orifice passage includes a main liquid chamber-side passage (21a) and an auxiliary liquid chamber-side passage (21b), the main liquid chamber-side passage and the auxiliary liquid chamber-side passage extend in a circumferential direction and are disposed at mutually different radial positions, a flow direction in the main liquid chamber-side passage and a flow direction in the auxiliary liquid chamber-side passage are opposite to each other when liquid flows through the orifice passage, a channel cross-sectional shape in at least one passage of the main liquid chamber-side passage and the auxiliary liquid chamber-side passage is a laterally long flat shape that is short in an axial direction along a central axis (O) of a first attachment member and long in a radial direction, and a ratio of a radial size to an axial size in the one passage is larger than the ratio in the (Continued)

other passage of the main liquid chamber-side passage and the auxiliary liquid chamber-side passage.

20 Claims, 8 Drawing Sheets

(56) References Cited

U.S. PATENT DOCUMENTS

| | | | | |
|---|---|---|---|---|
| 2010/0213650 | A1* | 8/2010 | Katayama | F16F 13/107 267/118 |
| 2015/0369327 | A1* | 12/2015 | Furumachi | B60K 5/1208 267/140.13 |
| 2018/0320754 | A1* | 11/2018 | Takakura | F16F 13/105 |
| 2019/0107171 | A1* | 4/2019 | Ueki | F16F 13/107 |
| 2019/0226549 | A1* | 7/2019 | Kojima | F16F 13/107 |
| 2020/0217392 | A1* | 7/2020 | Kojima | F16F 13/105 |
| 2020/0232534 | A1* | 7/2020 | Kojima | F16F 13/106 |
| 2020/0391583 | A1* | 12/2020 | Kim | B60K 5/1208 |
| 2022/0389986 | A1* | 12/2022 | Kojima | F16F 13/264 |
| 2023/0358293 | A1* | 11/2023 | Kojima | F16F 13/107 |

FOREIGN PATENT DOCUMENTS

| | | | |
|---|---|---|---|
| JP | 2009243595 A | 10/2009 | |
| WO | WO-2018051627 A1 * | 3/2018 | F16F 13/10 |
| WO | 2019/074069 A1 | 4/2019 | |

OTHER PUBLICATIONS

Jan. 4, 2023, search result of the Extended European Search Report issued by the European Patent Office in the corresponding European Patent Application No. 20791920.0.

* cited by examiner

ANTI-VIBRATION DEVICE

TECHNICAL FIELD

The present invention relates to an anti-vibration device that is applied to, for example, automobiles, industrial machines, or the like, and absorbs and damps vibrations of vibration generating parts, such as engines.

This application is a National Stage of International Application No. PCT/JP2020/003722 filed on Jan. 31, 2020, claiming priority based on Japanese Patent Application No. 2019-078794 filed on Apr. 17, 2019, the content of which is incorporated herein by reference.

BACKGROUND ART

Conventionally, for example, an anti-vibration device described in the following Patent Document 1 is known. The anti-vibration device includes a tubular first attachment member that is coupled to any one of a vibration generating part and a vibration receiving part, a second attachment member that is coupled to the other thereof, an elastic body that couples the first attachment member and the second attachment member to each other, and a partition member that partitions a liquid chamber within the first attachment member into a main liquid chamber having the elastic body in a portion of a partition wall thereof, and an auxiliary liquid chamber. The partition member includes a membrane that forms a portion of the partition wall of the main liquid chamber and an orifice passage that extends from the main liquid chamber toward the auxiliary liquid chamber.

CITATION LIST

[Patent Document]
[Patent Document 1]
Japanese Unexamined Patent Application, First Publication No. 2007-85523

SUMMARY OF INVENTION

Technical Problem

However, in the conventional anti-vibration device, a damping force generated when a bound load for causing a liquid to flow from the main liquid chamber toward the auxiliary liquid chamber is input and another damping force generated when a rebound load for causing the liquid to flow from the auxiliary liquid chamber toward the main liquid chamber is input cannot be made different from each other.

The present invention has been made in view of the aforementioned circumstances, and an object thereof is to provide an anti-vibration device capable of making a damping force generated when a bound load is input and another damping force generated when a rebound load is input different from each other.

Solution to Problem

An anti-vibration device according to the present invention includes a tubular first attachment member that is coupled to any one of a vibration generating part and a vibration receiving part, and a second attachment member that is coupled to the other thereof; an elastic body that couples the first attachment member and the second attachment member to each other; and a partition member that partitions a liquid chamber in the first attachment member into a main liquid chamber having the elastic body in a portion of a partition wall thereof, and an auxiliary liquid chamber, the partition member includes a membrane that forms a portion of the partition wall of the main liquid chamber, and an orifice passage that extends from the main liquid chamber toward the auxiliary liquid chamber, the orifice passage includes a main liquid chamber-side passage that is located on the main liquid chamber side and an auxiliary liquid chamber-side passage that extends from the main liquid chamber-side passage toward the auxiliary liquid chamber, the main liquid chamber-side passage and the auxiliary liquid chamber-side passage extend in a circumferential direction and are disposed at mutually different radial positions, a flow direction in the main liquid chamber-side passage and a flow direction in the auxiliary liquid chamber-side passage are opposite to each other when liquid flows through the orifice passage, a channel cross-sectional shape in at least one passage of the main liquid chamber-side passage and the auxiliary liquid chamber-side passage is a laterally long flat shape that is short in an axial direction along a central axis of the first attachment member and long in a radial direction, and a ratio of a radial size to an axial size in the one passage is larger than the ratio in the other passage of the main liquid chamber-side passage and the auxiliary liquid chamber-side passage.

Advantageous Effects of Invention

According to the present invention, the damping force generated when the bound load is input and the damping force generated when the rebound load is input can be made different from each other.

DESCRIPTION OF EMBODIMENTS

Hereinafter, an anti-vibration device related to a first embodiment of the present invention will be described, referring to FIGS. 1 and 2.

Figure 1:
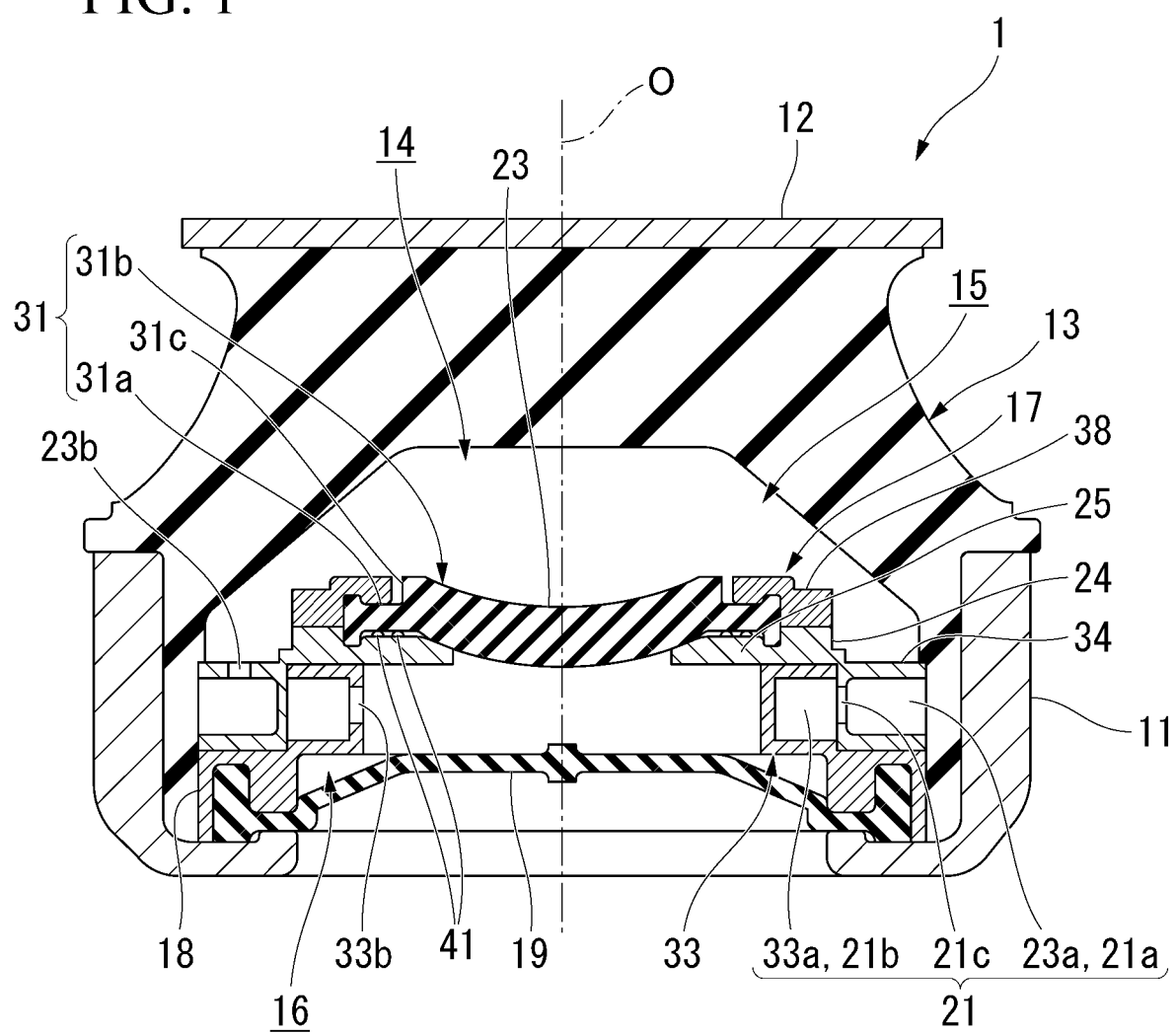
FIG. 1 is a longitudinal sectional view of an anti-vibration device related to a first embodiment of the present invention.
Figure 2:
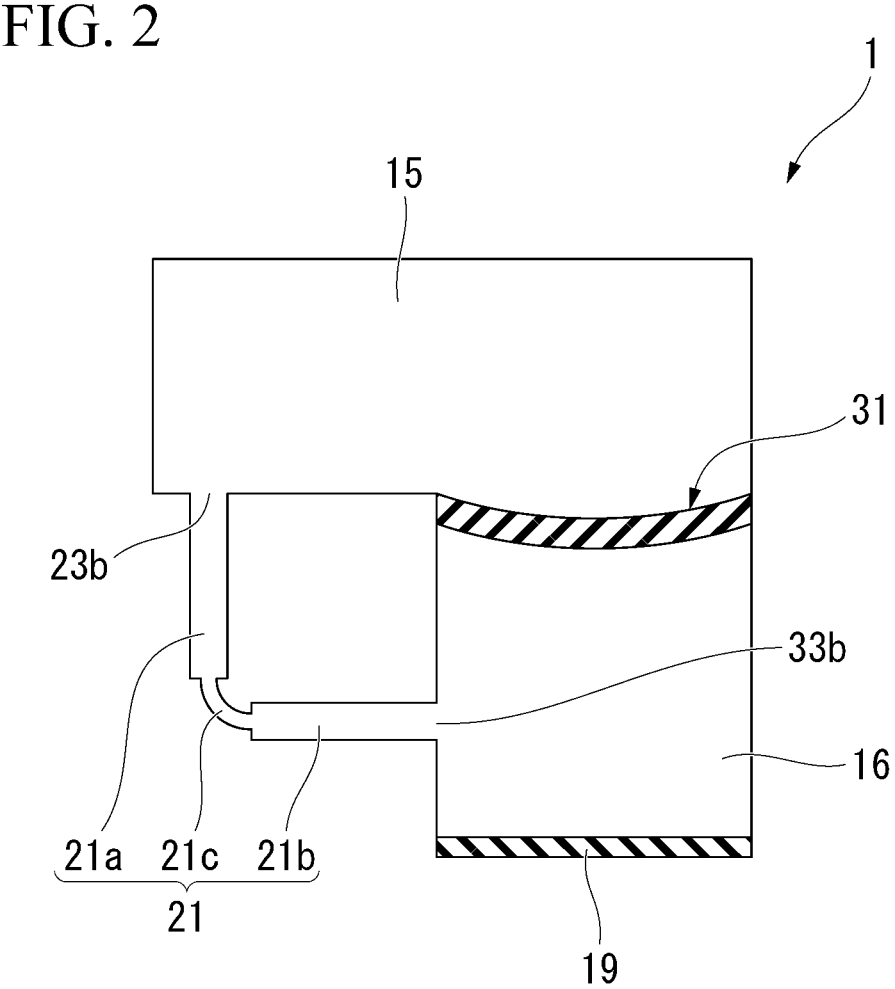
FIG. 2 is a schematic view of the anti-vibration device shown in FIG. 1.

As shown in FIG. 1, the anti-vibration device 1 includes a tubular first attachment member 11 that is coupled to any one of a vibration generating part and a vibration receiving part, a second attachment member 12 that is coupled to the other thereof, an elastic body 13 that couples the first attachment member 11 and the second attachment member 12 to each other, a partition member 17 that partitions a liquid chamber 14 within the first attachment member 11 into a main liquid chamber 15 having the elastic body 13 as a portion of a partition wall of the main liquid chamber 15 and an auxiliary liquid chamber 16. In the example shown, the partition member 17 partitions the liquid chamber 14 in an axial direction along a central axis O of the first attachment member 11.

When the anti-vibration device 1 is used in, for example, an engine mount of an automobile, the first attachment member 11 is coupled to a vehicle body serving as the vibration receiving part, and the second attachment member 12 is coupled to an engine serving as the vibration generating part. As a result, the transmission of the vibration of the engine to the vehicle body is suppressed. In addition, the first attachment member 11 may be coupled to the vibration generating part, and the second attachment member 12 may be coupled to the vibration receiving part.

Hereinafter, the main liquid chamber 15 side in the axial direction with respect to the partition member 17 is referred to as an upper side, and the auxiliary liquid chamber 16 side is referred to as a lower side. Additionally, in a plan view of the anti-vibration device 1 as viewed from the axial direction, a direction intersecting the central axis O is referred to as a radial direction, and a direction going around the central axis O is referred to as a circumferential direction.

The first attachment member 11 is formed in a bottomed tubular shape. A bottom part of the first attachment member 11 is formed in an annular shape and is disposed coaxially with the central axis O. An inner peripheral surface of a lower part of the first attachment member 11 is covered with a covering rubber formed integrally with the elastic body 13.

The second attachment member 12 is formed in a flat plate shape having front and back surfaces orthogonal to the central axis O. The second attachment member 12 is formed, for example, in a disk shape and is disposed coaxially with the central axis O.

The second attachment member 12 is disposed above the first attachment member 11. The external diameter of the second attachment member 12 is equal to the internal diameter of the first attachment member 11.

The elastic body 13 couples an inner peripheral surface of an upper part of the first attachment member 11 and a lower surface of the second attachment member 12 to each other. An upper end opening part of the first attachment member 11 is sealed with the elastic body 13. The elastic body 13 is vulcanized and bonded to the first attachment member 11 and the second attachment member 12. The elastic body 13 is formed in a topped tubular shape and is disposed coaxially with the central axis O. A top wall part of the elastic body 13 is coupled to the second attachment member 12, and a lower end part in a peripheral wall part thereof is coupled to the first attachment member 11. The peripheral wall part of the elastic body 13 gradually extends outward in the radial direction from the upper side to the lower side.

A diaphragm ring 18 is liquid-tightly fitted into the lower end part of the first attachment member 11 via the covering rubber. The diaphragm ring 18 is formed in a double tubular shape and is disposed coaxially with the central axis O. An outer peripheral part of a diaphragm 19, which is formed to be elastically deformable with rubber or the like, is vulcanized and bonded to the diaphragm ring 18. An outer peripheral part of the diaphragm 19 is vulcanized and bonded to an inner peripheral surface of an outer tube portion and an outer peripheral surface of an inner tube portion in the diaphragm ring 18. The diaphragm 19 is deformed to expand and contract with the inflow and outflow of a liquid into the auxiliary liquid chamber 16.

The liquid chamber 14 in which the liquid is enclosed is defined within the first attachment member 11 by the diaphragm 19 and the elastic body 13. In addition, as the liquid enclosed in the liquid chamber 14, for example, water, ethylene glycol, or the like can be used.

The partition member 17 is formed in a disk shape having front and back surfaces orthogonal to the central axis O and is fitted into the first attachment member 11 via the covering rubber. The liquid chamber 14 within the first attachment member 11 is divided into the main liquid chamber 15 defined by the elastic body 13 and the partition member 17 and the auxiliary liquid chamber 16 defined by the diaphragm 19 and the partition member 17 by the partition member 17.

The partition member 17 includes a tubular body member 34 that is fitted into the first attachment member 11 via the covering rubber, a membrane 31 that blocks an upper end opening part of the body member 34 and forms a portion of the partition wall of the main liquid chamber 15, a tubular lower member 33 that is fitted in the body member 34, a first sandwiching part 25 and a second sandwiching part 38 that sandwich an outer peripheral edge part part 31a of the membrane 31 from both sides in the axial direction, and a first orifice passage (orifice passage) 21 that extends from the main liquid chamber 15 toward the auxiliary liquid chamber 16.

The membrane 31 is formed in a disk shape with an elastic material, such as rubber. The membrane 31 is disposed coaxially with the central axis O. The volume of the membrane 31 is smaller than the volume of the elastic body 13. The membrane 31 includes a disk-shaped body part 31b, and an outer peripheral edge part 31a that is formed to be thinner than the body part 31b, protrudes outward in the radial direction from a lower part of the body part 31b, and continuously extends over the entire circumference. Locking projections, which protrude toward both sides in the axial direction, are formed on an outer end part of the outer peripheral edge part 31a in the radial direction.

The body member 34 is disposed coaxially with the central axis O. A first orifice groove 23a, which opens outward in the radial direction and extends in the circumferential direction, is formed in an outer peripheral surface of the body member 34. A radially outer opening of the first orifice groove 23a is blocked by the covering rubber. A first communication hole 23b, which allows the main liquid chamber 15 and the first orifice groove 23a to communicate with each other, is formed in an upper surface of the body member 34. The first communication hole 23b allows the main liquid chamber 15 and the first orifice groove 23a to communicate with each other in the axial direction.

The first orifice groove 23a extends in the circumferential direction over an angular range exceeding 180° from the first communication hole 23b toward one side in the circumferential direction with the central axis O as a center.

The first sandwiching part 25 supports a lower surface of the membrane 31, and the second sandwiching part 38 supports an upper surface of the membrane 31. The first sandwiching part 25 and the second sandwiching part 38 are formed in an annular shape, respectively, and are disposed coaxially with the central axis O.

As the outer peripheral edge part 31a of the membrane 31 is sandwiched and fixed by the first sandwiching part 25 and the second sandwiching part 38 in the axial direction, the membrane 31 is supported to be elastically deformable in the axial direction with the outer peripheral edge part 31a thereof as a fixed end.

The first sandwiching part 25 is coupled to the body member 34 via an outer flange part 24. The outer flange part 24 is formed integrally with the body member 34 and protrudes inward in the radial direction from an upper end part of the body member 34. The outer flange part 24 is disposed coaxially with the central axis O. The first sandwiching part 25 is formed integrally with the outer flange part 24 and protrudes inward in the radial direction from the outer flange part 24. Respective lower surfaces of the first sandwiching part 25 and the outer flange part 24 are flush with each other. An upper surface of the first sandwiching part 25 is located below the upper surface of the outer flange part 24. A lower annular groove, which continuously extends over the entire circumference, is formed at an outer peripheral edge part in the upper surface of the first sandwiching part 25.

An outer peripheral part of the second sandwiching part 38 is disposed on the upper surface of the outer flange part 24 and the inner peripheral part thereof supports the upper surface of the membrane 31. An upper annular groove, which continuously extends over the entire circumference, is formed at an outer peripheral edge part in a lower surface of an inner peripheral part of the second sandwiching part 38. The upper annular groove faces the lower annular groove of the first sandwiching part 25 in the axial direction. The locking projections of the outer peripheral edge part 31a of the membrane 31 are separately locked to the upper annular groove and the lower annular groove.

Here, the portion of the body part 31b of the membrane 31 located above the outer peripheral edge part 31a is inserted into the inner peripheral part of the second sandwiching part 38. A radial gap is provided between an outer peripheral surface (hereinafter, referred to as the outer peripheral surface 31c of the body part 31b of the membrane 31) of the portion of the body part 31b of the membrane 31 located above the outer peripheral edge part 31a, and an inner peripheral surface of the inner peripheral part of the second sandwiching part 38. The inner peripheral surface of the inner peripheral part of the second sandwiching part 38 and the outer peripheral surface 31c of the body part 31b of the membrane 31 extend in the axial direction, respectively. The inner peripheral surface of the inner peripheral part of the second sandwiching part 38 and the outer peripheral surface 31c of the body part 31b of the membrane 31 are substantially parallel to each other. In addition, the inner peripheral surface of the inner peripheral part of the second sandwiching part 38 and the outer peripheral surface 31c of the body part 31b of the membrane 31 may be inclined with respect to each other.

The lower member 33 is formed in a tubular shape and is disposed coaxially with the central axis O. The lower member 33 is liquid-tightly fitted into the body member 34. An upper end opening edge of a peripheral wall part of the lower member 33 integrally abuts respective lower surfaces of the first sandwiching part 25 and the outer flange part 24.

Here, the membrane 31 and the diaphragm 19 face each other in the axial direction through the inside of the lower member 33 and through the inside of the first sandwiching part 25. As a result, the auxiliary liquid chamber 16 is defined by the lower surface of the membrane 31, an inner peripheral surface of the lower member 33, and the diaphragm 19. The auxiliary liquid chamber 16 is disposed opposite to the main liquid chamber 15 with the membrane 31 interposed therebetween. That is, the auxiliary liquid chamber 16 and the main liquid chamber 15 are partitioned in the axial direction by the membrane 31.

A second orifice groove 33a, which opens outward in the radial direction and extends in the circumferential direction, is formed in an outer peripheral surface of the peripheral wall part of the lower member 33. A radially outer opening of the second orifice groove 33a is blocked by an inner peripheral surface of the body member 34. A second communication hole 33b, which allows the second orifice groove 33a and the auxiliary liquid chamber 16 to communicate with each other, is formed in an inner peripheral surface of the peripheral wall part of the lower member 33. The second communication hole 33b allows the second orifice groove 33a and the auxiliary liquid chamber 16 to communicate with each other in the radial direction. The positions of the second communication hole 33b and the first communication hole 23b in the circumferential direction are equal to each other.

The second orifice groove 33a extends in the circumferential direction over an angular range exceeding 180° from the second communication hole 33b toward one side in the circumferential direction with the central axis O as a center. The second orifice groove 33a is located radially inside the first orifice groove 23a. End parts of the second orifice groove 33a and the first orifice groove 23a on one side in the circumferential direction are disposed at the same circumferential position.

The aforementioned diaphragm ring 18 protrudes outward in the radial direction from a lower end part of the lower member 33. The diaphragm ring 18 is formed integrally with the lower member 33. A lower surface of the body member 34 liquid-tightly abuts an upper surface of the diaphragm ring 18.

Here, a connection hole 21c, which allows the first orifice groove 23a and the second orifice groove 33a to communicate with each other, is formed in the inner peripheral surface of the body member 34. The connection hole 21c allows the first orifice groove 23a and the second orifice groove 33a to communicate with each other in the radial direction. Also, the first orifice passage 21, which extends from the main liquid chamber 15 toward the auxiliary liquid chamber 16, is constituted of the first orifice groove 23a having the radially outer opening blocked by the covering rubber, the second orifice groove 33a having a radially outer opening blocked by the inner peripheral surface of the body member 34, and the connection hole 21c.

Hereinafter, the portion of the first orifice passage 21, which is located on the main liquid chamber 15 side and is defined by the first orifice groove 23a, is referred to as a main liquid chamber-side passage 21a, and the portion of the first orifice passage 21, which extends from the main liquid chamber-side passage 21a through the connection hole 21c toward the auxiliary liquid chamber 16 and is defined by the second orifice groove 33a, is referred to as an auxiliary liquid chamber-side passage 21b.

The main liquid chamber-side passage 21a is located radially outside the auxiliary liquid chamber-side passage 21b. In addition, the main liquid chamber-side passage 21a may be located radially inside the auxiliary liquid chamber-side passage 21b.

The respective channel cross-sectional areas of the main liquid chamber-side passage 21a and the auxiliary liquid chamber-side passage 21b may be equal to each other or may be different from each other.

Here, the connection hole 21c connects an end part of the first orifice groove 23a on one side in the circumferential direction and an end part of the second orifice groove 33a on one side in the circumferential direction to each other. As a result, in the process in which the liquid flows from any one passage of the main liquid chamber-side passage 21a and the auxiliary liquid chamber-side passage 21b through the connection hole 21c into the other passage and flows through the other passage, the flow direction of the liquid flowing through the one passage and the flow direction of the liquid flowing through the other passage are opposite to each other in the circumferential direction.

The main liquid chamber-side passage 21a and the auxiliary liquid chamber-side passage 21b are passages having a longer channel length than a channel diameter. In the example shown, the channel cross-sectional shape of the first orifice passage 21 is a rectangular shape. In this case, when the channel cross-sectional shape is substituted with a circular shape having the same channel cross-sectional area, the channel diameter can be represented by the diameter of the circular shape.

In addition, the channel cross-sectional shape of the first orifice passage 21 is not limited to a rectangular shape and may be appropriately changed.

If the first orifice passage 21 has a normal straight shape, a pressure loss occurs due to resonance due to the moment of inertia of the orifice. Since the first orifice passage 21 of the present application is bent by 180°, the pressure loss is further increased by further damping due to a turbulent flow.

Also, in the present embodiment, the channel cross-sectional shape of the passage in at least one of the main liquid chamber-side passage 21a and the auxiliary liquid chamber-side passage 21b is a laterally long flat shape that is short in the axial direction and long in the radial direction, and the ratio of a radial size to an axial size in the one passage is larger than the ratio in the other passage of the main liquid chamber-side passage 21a and the auxiliary liquid chamber-side passage 21b.

In the example shown, the channel cross-sectional shape of the main liquid chamber-side passage 21a is the aforementioned flat shape, and the channel cross-sectional shape of the auxiliary liquid chamber-side passage 21b is a square shape, and the ratio in the main liquid chamber-side passage 21a is larger than the ratio in the auxiliary liquid chamber-side passage 21b.

As a result, the auxiliary liquid chamber 16 is located on the auxiliary liquid chamber-side passage 21b side of which the ratio is smaller out of the main liquid chamber-side passage 21a and the auxiliary liquid chamber-side passage 21b in the flow direction of the liquid in the first orifice passage 21 with respect to the main liquid chamber 15, and the main liquid chamber 15 is located on the main liquid chamber-side passage 21a side of which the ratio is larger out of the main liquid chamber-side passage 21a and the auxiliary liquid chamber-side passage 21b in the flow direction of the liquid in the first orifice passage 21 with respect to the auxiliary liquid chamber 16.

The ratio in the main liquid chamber-side passage 21a is 1.3 or more. The channel cross-sectional area of the main liquid chamber-side passage 21a is larger than the channel cross-sectional area of the auxiliary liquid chamber-side passage 21b. It is more preferable that the ratio in the main liquid chamber-side passage 21a is 1.5 or more.

In addition, the channel cross-sectional shape of the auxiliary liquid chamber-side passage 21b may also be the aforementioned flat shape. The ratio in the main liquid chamber-side passage 21a may be less than 1.3. The channel cross-sectional area of the main liquid chamber-side passage 21a may be equal to or less than the channel cross-sectional area of the auxiliary liquid chamber-side passage 21b.

Additionally, an uneven swelling part 23 is formed that makes the swelling deformation of the membrane 31 toward the auxiliary liquid chamber 16 smaller than the swelling deformation of the membrane 31 toward the main liquid chamber 15 when the same pressing force is applied to the membrane 31.

The uneven swelling part 23 is curved so as to project toward the auxiliary liquid chamber 16. The uneven swelling part 23 is integrally formed over the entire body part 31b, which is located radially inside the outer peripheral edge part 31a sandwiched in the axial direction by the first sandwiching part 25 and the second sandwiching part 38, in the membrane 31. In addition, the uneven swelling part 23 is not limited to the aforementioned curved shape and may be appropriately changed, for example, by changing the size of grooves formed in the upper and lower surfaces of the membrane 31.

Moreover, in the present embodiment, the first sandwiching part 25, which supports the membrane 31 from the auxiliary liquid chamber 16 side, protrudes longer inward in the radial direction than the second sandwiching part 38 that supports the membrane 31 from the main liquid chamber 15 side. The portion of the first sandwiching part 25 located radially inside the second sandwiching part 38 supports an outer peripheral part in a lower surface of the body part 31b of the membrane 31. The upper surface of the inner peripheral edge part of the first sandwiching part 25, which abuts the membrane 31, is gradually inclined downward so as to be separated from the main liquid chamber 15 inward in the radial direction. In the example shown, the upper surface of the inner peripheral edge part of the first sandwiching part 25 is formed in a curved surface shape that projects toward the upper side that is the main liquid chamber 15 side. In addition, the upper surface of the inner peripheral edge part of the first sandwiching part 25 may be a flat surface that extends in the direction orthogonal to the central axis O.

The lower surface of the membrane 31 abuts the upper surface of the inner peripheral edge part of the first sandwiching part 25. The uneven swelling part 23 of the membrane 31 overhangs to the inside of the first sandwiching part 25. Respective axial positions of a lower end part in a lower surface of the uneven swelling part 23 and a lower surface of the first sandwiching part 25 are the same as each other. A lower end part in the lower surface of the uneven swelling part 23 is located at a central part of the membrane 31 in the radial direction. The lower surface of the membrane 31 is in non-contact with an inner peripheral surface of the first sandwiching part 25. The membrane 31 abuts the entire upper surface of the first sandwiching part 25, and the entire lower surface of the inner peripheral part of the second sandwiching part 38.

In addition, the lower surface of the membrane 31 may be spaced apart upward from the upper surface of the inner peripheral edge part of the first sandwiching part 25. The uneven swelling part 23 of the membrane 31 may be located above the inner peripheral surface of the first sandwiching part 25. The lower surface of the membrane 31 may be brought into contact with the inner peripheral surface of the first sandwiching part 25.

Moreover, in the present embodiment, at least one of the first sandwiching part 25 and the outer peripheral edge part 31a of the membrane 31 is provided with a plurality of support projections 41 that protrude toward and abuts the other.

In the example shown, the support projections 41 are formed on an upper surface of the first sandwiching part 25. The support projections 41 may be formed in a portion where the lower surface of the membrane 31 is capable of being spaced apart upward in the upper surface of the first sandwiching part 25 abutting the lower surface of the membrane 31 when a load is input to the anti-vibration device 1 and the membrane 31 is deformed or displaced toward the main liquid chamber 15. The support projections 41 are formed in a curved surface shape that projects upward. The plurality of support projections 41 are disposed at regular intervals in the radial direction and the circumferential direction in the membrane 31.

In addition, the support projections 41 may be formed on a lower surface of the outer peripheral edge part 31a of the membrane 31. The support projections 41 may be formed in a portion, which is capable of being spaced apart upward from the upper surface of the first sandwiching part 25 in the lower surface of the membrane 31 abutting the upper surface of the first sandwiching part 25, when a load is input to the anti-vibration device 1 and the membrane 31 is deformed or displaced toward the main liquid chamber 15. The support projection 41 may be formed on both or may not be formed on any of the first sandwiching part 25 and the outer peripheral edge part 31a of the membrane 31.

As described above, according to the anti-vibration device 1 according to the present embodiment, the ratio in the main liquid chamber-side passage 21a is larger than the ratio in the auxiliary liquid chamber-side passage 21b. Thus, when a bound load is input, it is possible to generate a large flow velocity difference between a radially inner portion and a radially outer portion in the main liquid chamber-side passage 21a where the liquid in the main liquid chamber 15 first flows in and flows therethrough. Accordingly, a large pressure loss can be caused in combination with the fact that the flow direction of the liquid in this case is opposite to the subsequent flow direction of the liquid in the auxiliary liquid chamber-side passage 21b. As a result, a high damping force can be generated when the bound load is input.

On the other hand, when a rebound load is input and when the liquid in the auxiliary liquid chamber 16 flows through the first orifice passage 21 toward the main liquid chamber 15, the liquid first flows into the auxiliary liquid chamber-side passage 21b and flows therethrough. Thus, the flow velocity of the liquid flowing in the main liquid chamber-side passage 21a has already decreased in combination with the fact that the flow direction of the liquid in this case is opposite to the subsequent flow direction of the liquid in the main liquid chamber-side passage 21a. Therefore, in the main liquid chamber-side passage 21a, a flow velocity difference between the radially inner portion and the radially outer portion is less likely to occur. As a result, the damping force generated when the rebound load is input can be suppressed to be lower than the damping force generated when the bound load is input.

As described above, the damping force generated when the bound load is input can reliably be made higher than the damping force generated when the rebound load is input, and the difference between both the damping forces can be increased, and the ratio of the damping force generated when the bound load is input to the damping force generated when the rebound load is input can be increased.

Since the ratio in the main liquid chamber-side passage 21a is 1.3 or more, each of the aforementioned working effects is reliably achieved.

Each of the aforementioned working effects is achieved, for example, by a configuration in which a member that operates when the hydraulic pressure in the main liquid chamber 15 reaches a predetermined value is not adopted, and as described above, for example, the ratio in any one passage out of the main liquid chamber-side passage 21a and the auxiliary liquid chamber-side passages 21b is larger than the ratio in the other passage as mentioned above, and the channel cross-sectional shape in the one passage is set to the aforementioned flat shape. Therefore, even if the vibration has a relatively small amplitude, the aforementioned working effects can be stably and accurately achieved.

Since the uneven swelling part 23 is formed in the membrane 31, when the same pressing force is applied, the amount of swelling deformation of the membrane 31 toward the auxiliary liquid chamber 16 is smaller than that toward the main liquid chamber 15.

Hence, if the rebound load is input to the anti-vibration device 1, the damping force to be generated can be suppressed to be low as the membrane 31 is largely swelled and deformed toward the main liquid chamber 15 by the uneven swelling part 23. On the other hand, if the bound load is input to the anti-vibration device 1, the swelling deformation of the membrane 31 toward the auxiliary liquid chamber 16 becomes smaller than the swelling deformation of the membrane 31 toward the main liquid chamber 15 when the rebound load is input, the positive pressure of the main liquid chamber 15 is not easily relieved, and the damping force to be generated becomes high.

As described above, the ratio of the damping force generated when the bound load is input to the damping force generated when the rebound load is input can be reliably increased.

Moreover, even if the main liquid chamber 15 tends to have a negative pressure suddenly with the input of a large rebound load, the membrane 31 is largely swelled and deformed toward the main liquid chamber 15 by the uneven swelling part 23, and thereby, the negative pressure of the main liquid chamber 15 can be suppressed. Therefore, the occurrence of cavitation can also be suppressed.

Additionally, since the uneven swelling part 23 is curved so as to project toward the auxiliary liquid chamber 16, a configuration in which the swelling deformation of the membrane 31 toward the auxiliary liquid chamber 16 is smaller than the swelling deformation of the membrane 31 toward the main liquid chamber 15 when the same pressing force is applied to the membrane 31 can be easily and reliably realized.

Additionally, the uneven swelling part 23 is integrally formed over the entire body part 31b, which is located radially inside the outer peripheral edge part 31a sandwiched in the axial direction by the first sandwiching part 25 and the second sandwiching part 38, in the membrane 31. Thus, it is possible to largely swell and deform the membrane 31 toward the main liquid chamber 15, and the damping force generated when the bound load is input and the damping force generated when the rebound load is input can be made greatly different from each other.

Additionally, since the uneven swelling part 23 overhangs to the inside of the first sandwiching part 25, a configuration in which the swelling deformation of the membrane 31 toward the auxiliary liquid chamber 16 is made smaller than the swelling deformation of the membrane 31 toward the main liquid chamber 15 when the same pressing force is applied can be much more reliably realized.

Additionally, in the present embodiment, the first sandwiching part 25, which protrudes longer inward in the radial direction than the second sandwiching part 38, supports the membrane 31 from the auxiliary liquid chamber 16 side. Thus, when the same pressing force is applied, the amount of swelling deformation of the membrane 31 toward the auxiliary liquid chamber 16 is smaller than that toward the main liquid chamber 15.

That is, if the bound load is input to the anti-vibration device 1, the swelling deformation of the membrane 31 toward the auxiliary liquid chamber 16 is restrained by the first sandwiching part 25, the positive pressure of the main liquid chamber 15 is not easily relieved, and the damping force to be generated becomes high. On the other hand, if the rebound load is input to the anti-vibration device 1, the swelling deformation of the membrane 31 toward the main liquid chamber 15 becomes larger than the swelling deformation of the membrane 31 toward the auxiliary liquid chamber 16 when the bound load is input since the second sandwiching part 38 does not protrude inward in the radial direction from the first sandwiching part 25, and the damping force to be generated can be suppressed to be low.

As described above, the ratio of the damping force generated when the bound load is input to the damping force generated when the rebound load is input can be reliably increased.

Also in this configuration, the membrane 31 is more easily swelled and deformed toward the main liquid chamber 15 than toward the auxiliary liquid chamber 16. Thus, even if the main liquid chamber 15 tends to have a negative pressure suddenly with the input of a large rebound load, the membrane 31 is swelled and deformed toward the main liquid chamber 15, and thereby, it is possible to suppress the negative pressure of the main liquid chamber 15, and the occurrence of cavitation can also be suppressed.

Additionally, at least one of the first sandwiching part 25 and the outer peripheral edge part 31a of the membrane 31 is formed with the plurality of support projections 41 that protrude toward and abuts the other. Thus, when a load is input to the anti-vibration device 1 and the membrane 31 is deformed or displaced toward the auxiliary liquid chamber 16, it is possible to inhibit the outer peripheral edge part 31a of the membrane 31 from colliding against the first sandwiching part 25 all at once over a wide range, and the striking sound to be generated can be suppressed to be small.

Additionally, the radial gap is provided between the outer peripheral surface 31c of the body part 31b of the membrane 31 and the inner peripheral surface of the inner peripheral part of the second sandwiching part 38. Thus, even with the vibration of a relatively small amplitude, when the rebound load is input, it is possible to smoothly swell and deform the membrane 31 toward the main liquid chamber 15, and the damping force to be generated can be reliably suppressed to be low. Additionally, when the membrane 31 tends to be excessively swelled and deformed toward the main liquid chamber 15 at the time of the input of the rebound load, the outer peripheral surface 31c of the body part 31b can be made to abut the inner peripheral surface of the inner peripheral part of the second sandwiching part 38, and a large load can be prevented from being applied to the connection portion between the outer peripheral edge part 31a and the body part 31b in the membrane 31.

Figure 3:
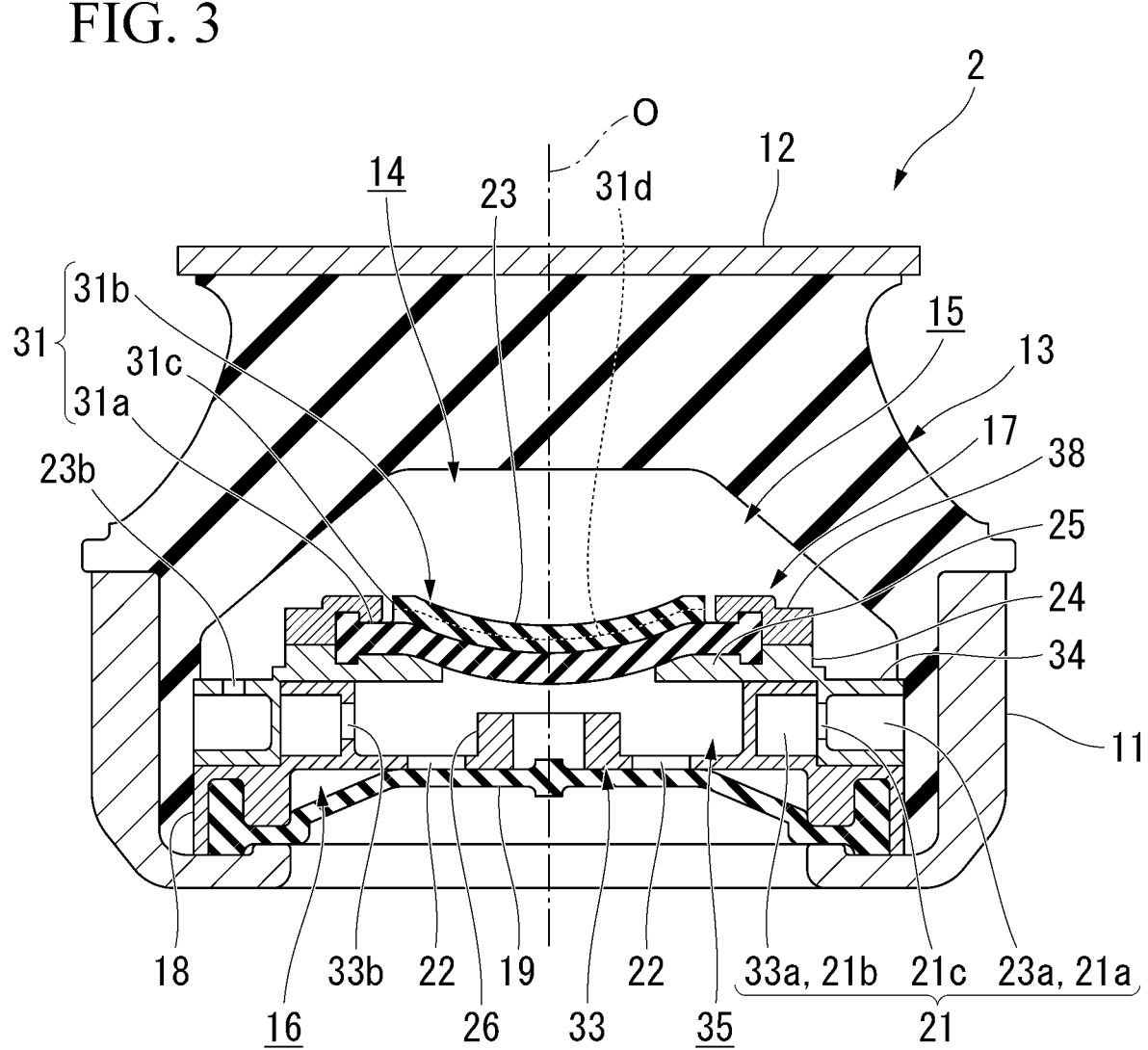
FIG. 3 is a longitudinal sectional view of an anti-vibration device related to a second embodiment of the present invention.
Figure 4:
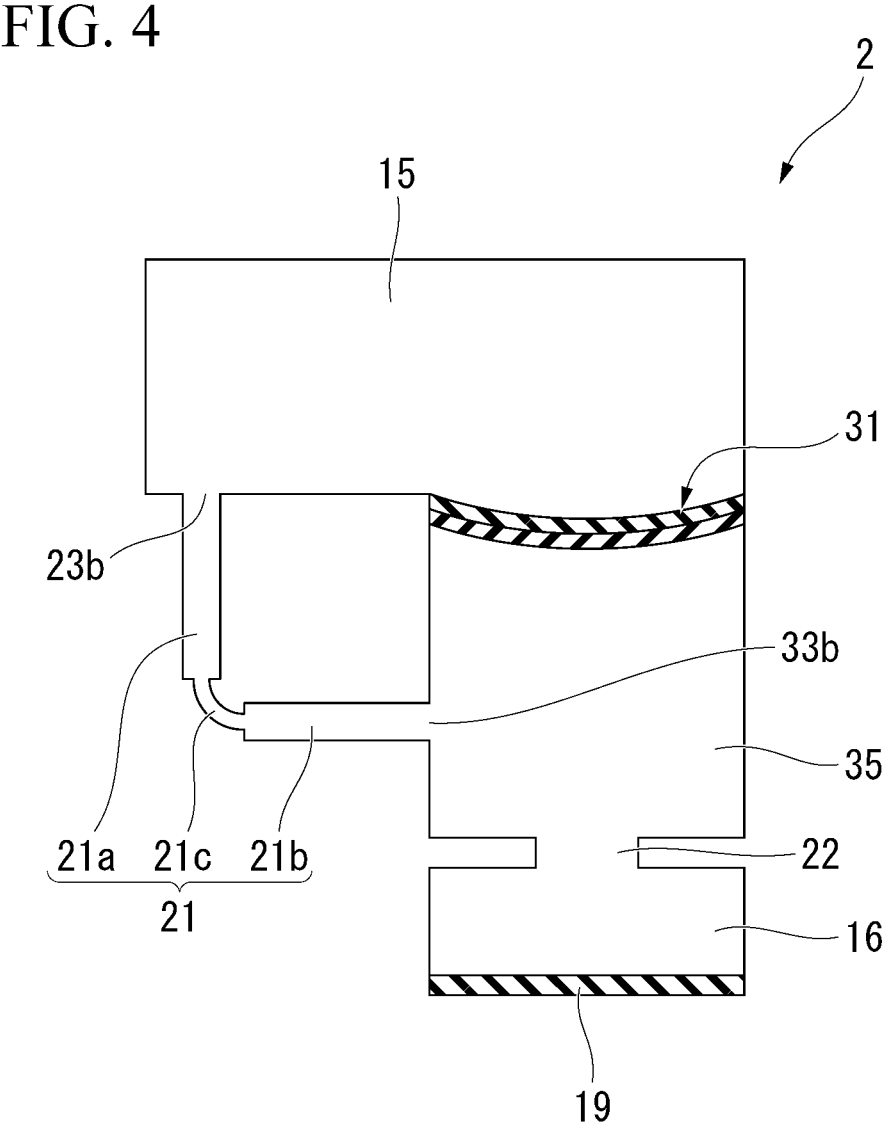
FIG. 4 is a schematic view of the anti-vibration device shown in FIG. 3.

Next, an anti-vibration device 2 related to a second embodiment of the present invention will be described, referring to FIGS. 3 and 4.

In addition, in the second embodiment, the same portions as the constituent elements in the above-described first embodiment will be designated by the same reference signs, and a description thereof will be omitted, and only differences will be described.

In the present embodiment, the support projections 41 are not formed on the first sandwiching part 25. Additionally, the partition member 17 includes an intermediate liquid chamber 35 that is located opposite to the main liquid chamber 15 with the membrane 31 interposed therebetween and allows the auxiliary liquid chamber-side passage 21b of the first orifice passage 21 and the auxiliary liquid chamber 16 to communicate with each other, and the first orifice passage 21 allows the main liquid chamber 15 and the intermediate liquid chamber 35 to communicate with each other.

The intermediate liquid chamber 35 is located on the auxiliary liquid chamber-side passage 21b side where the ratio is small out of the main liquid chamber-side passage 21a and the auxiliary liquid chamber-side passage 21b in the flow direction of the liquid in the first orifice passage 21 with respect to the main liquid chamber 15.

Also, the rigidity of a lower part of the membrane 31, which forms a portion of the partition wall of the intermediate liquid chamber 35, is higher than the rigidity of an upper part of the membrane 31, which forms a portion of the partition wall of the main liquid chamber 15.

In the membrane 31, the rigidity of an upper part of the body part 31b is higher than the rigidity of each of a lower part of the body part 31b and the outer peripheral edge part 31a except for the upper part. For example, a reinforcing member 31d, such as a canvas, is buried at the upper part of the body part 31b. The thicknesses of each of the upper part and the lower part of the body part 31b are equal to each other. The level of the rigidity of each of an upper part and a lower part of the membrane 31 can be specified depending on the magnitude of a reaction force measured when the upper part and the lower part of the membrane 31 are separately pushed and elastically deformed with the same amount of displacement in the axial direction.

In addition, the upper part of the body part 31b may be formed of a material having rigidity higher than that of a material that forms the lower part of the body part 31b and the outer peripheral edge part 31a without burying the reinforcing member 31d in the upper part of the body part 31b. The membrane 31 may be formed by, for example, two-color molding or the like.

Here, the lower member 33 is formed in a bottomed tubular shape, is disposed coaxially with the central axis O and blocks a lower end opening part of the body member 34. An upper surface of the bottom wall part of the lower member 33 is separated downward from the lower surface of the membrane 31. The aforementioned intermediate liquid chamber 35 is defined by the upper surface of the bottom wall part and an inner peripheral surface of the peripheral wall part in the lower member 33 and the lower surface of the membrane 31. That is, the intermediate liquid chamber 35 has the membrane 31 as a portion of a partition wall thereof, and the intermediate liquid chamber 35 and the main liquid chamber 15 are partitioned in the axial direction by the membrane 31. The internal volume of the intermediate liquid chamber 35 is smaller than the internal volume of the main liquid chamber 15.

A second communication hole 33b formed in an inner peripheral surface of a peripheral wall part of the lower member 33 allows the second orifice groove 33a and the intermediate liquid chamber 35 to communicate with each other in the radial direction.

The auxiliary liquid chamber 16 is defined by a lower surface of the bottom wall part in the lower member 33 and the diaphragm 19. A bottom wall part of the lower member 33 forms a partition wall that partitions the auxiliary liquid chamber 16 and the intermediate liquid chamber 35 in the axial direction.

A second orifice passage 22, which allows the auxiliary liquid chamber 16 and the intermediate liquid chamber 35 to communicate with each other, is formed in the bottom wall part of the lower member 33. The second orifice passage 22 allows the auxiliary liquid chamber 16 and the intermediate liquid chamber 35 to communicate with each other in the axial direction. An opening part of the second orifice passage 22 on the intermediate liquid chamber 35 side faces the membrane 31. The second orifice passage 22 is a throughhole formed in the bottom wall part of the lower member 33, and a plurality of the second orifice passages 22 are formed in the bottom wall part of the lower member 33. At least some of the second orifice passages 22 face the membrane 31 in the axial direction.

The channel cross-sectional area and the channel length of each second orifice passage 22 are smaller than the channel cross-sectional area and the channel length of the first orifice passage 21. The channel length of the second orifice passage 22 is smaller than the internal diameter thereof. In addition, the channel length of the second orifice passage 22 may be equal to or greater than the internal diameter. The flow resistance of the liquid in each second orifice passage 22 is smaller than the flow resistance of the liquid in the first orifice passage 21.

A restriction projection 26, which restricts excessively large swelling deformation of the membrane 31 toward the intermediate liquid chamber 35, is disposed on the upper surface of the bottom wall part in the lower member 33. The restriction projection 26 is formed integrally with the lower member 33. The restriction projection 26 is formed in a tubular shape and is disposed coaxially with the central axis O.

In addition, the restriction projection 26 may be formed in a solid form or may not be disposed coaxially with the central axis O.

Additionally, in the present embodiment, an opening direction in which the first orifice passage 21 opens toward the intermediate liquid chamber 35, that is, an opening direction of the second communication hole 33b toward the intermediate liquid chamber 35 intersects an opening direction in which the second orifice passage 22 opens toward the intermediate liquid chamber 35. In the example shown, the second communication hole 33b opens in the radial direction toward the intermediate liquid chamber 35, and the second orifice passage 22 opens in the axial direction toward the intermediate liquid chamber 35. That is, the opening direction of the second communication hole 33b toward the intermediate liquid chamber 35 is orthogonal to the opening direction in which the second orifice passage 22 opens toward the intermediate liquid chamber 35.

Additionally, in the present embodiment, the cross-sectional area of the intermediate liquid chamber 35 in the direction orthogonal to the opening direction in which the second orifice passage 22 opens toward the intermediate liquid chamber 35 is larger than the channel cross-sectional area of the second orifice passage 22, the channel cross-sectional area of the auxiliary liquid chamber-side passage 21b of the first orifice passage 21, and the channel cross-sectional area of the main liquid chamber-side passage 21a of the first orifice passage 21.

As described above, according to the anti-vibration device 2 related to the present embodiment, the rigidity of the lower part of the membrane 31, which forms a portion of the partition wall of the intermediate liquid chamber 35, is lower than the rigidity of the upper part of the membrane 31, which forms a portion of the partition wall of the main liquid chamber 15. Thus, when the same pressing force is applied, the swelling deformation of the membrane 31 toward the main liquid chamber 15 is larger than the swelling deformation of the membrane 31 toward the intermediate liquid chamber 35.

Hence, if the rebound load is input to the anti-vibration device 2, the damping force to be generated can be suppressed to be low as the membrane 31 is largely swelled and deformed toward the main liquid chamber 15.

On the other hand, if the bound load is input to the anti-vibration device 2, the swelling deformation of the membrane 31 toward the intermediate liquid chamber 35 becomes smaller than the swelling deformation of the membrane 31 toward the main liquid chamber 15 when the rebound load is input, the positive pressure of the main liquid chamber 15 is not easily relieved, and the damping force to be generated becomes high. As described above, the ratio of the damping force generated when the bound load is input to the damping force generated when the rebound load is input can be reliably increased.

Moreover, the rigidity of the lower part of the membrane 31, which forms a portion of a partition wall of the intermediate liquid chamber 35, is lower than the rigidity of the upper part of the membrane 31 that forms a portion of a partition wall of the main liquid chamber 15. Therefore, when the main liquid chamber 15 tends to have a negative pressure suddenly with the input of a large rebound load, it is possible to smoothly swell and deform the membrane 31 toward the main liquid chamber 15, and the negative pressure of the main liquid chamber 15 can be suppressed, and occurrence of cavitation can be suppressed.

Additionally, since the opening direction in which the first orifice passage 21 opens toward the intermediate liquid chamber 35 intersects the opening direction in which the second orifice passage 22 opens toward the intermediate liquid chamber 35, it is possible to suppress that the liquid from the main liquid chamber 15 side that has flowed into the intermediate liquid chamber 35 goes straight toward the second orifice passage 22, and this liquid can be diffused within the intermediate liquid chamber 35. As a result, the flow velocity of the liquid can be reliably reduced until the liquid of the main liquid chamber 15 flows into the second orifice passage 22, and a high damping force can be generated when the bound load is input.

Figure 5:
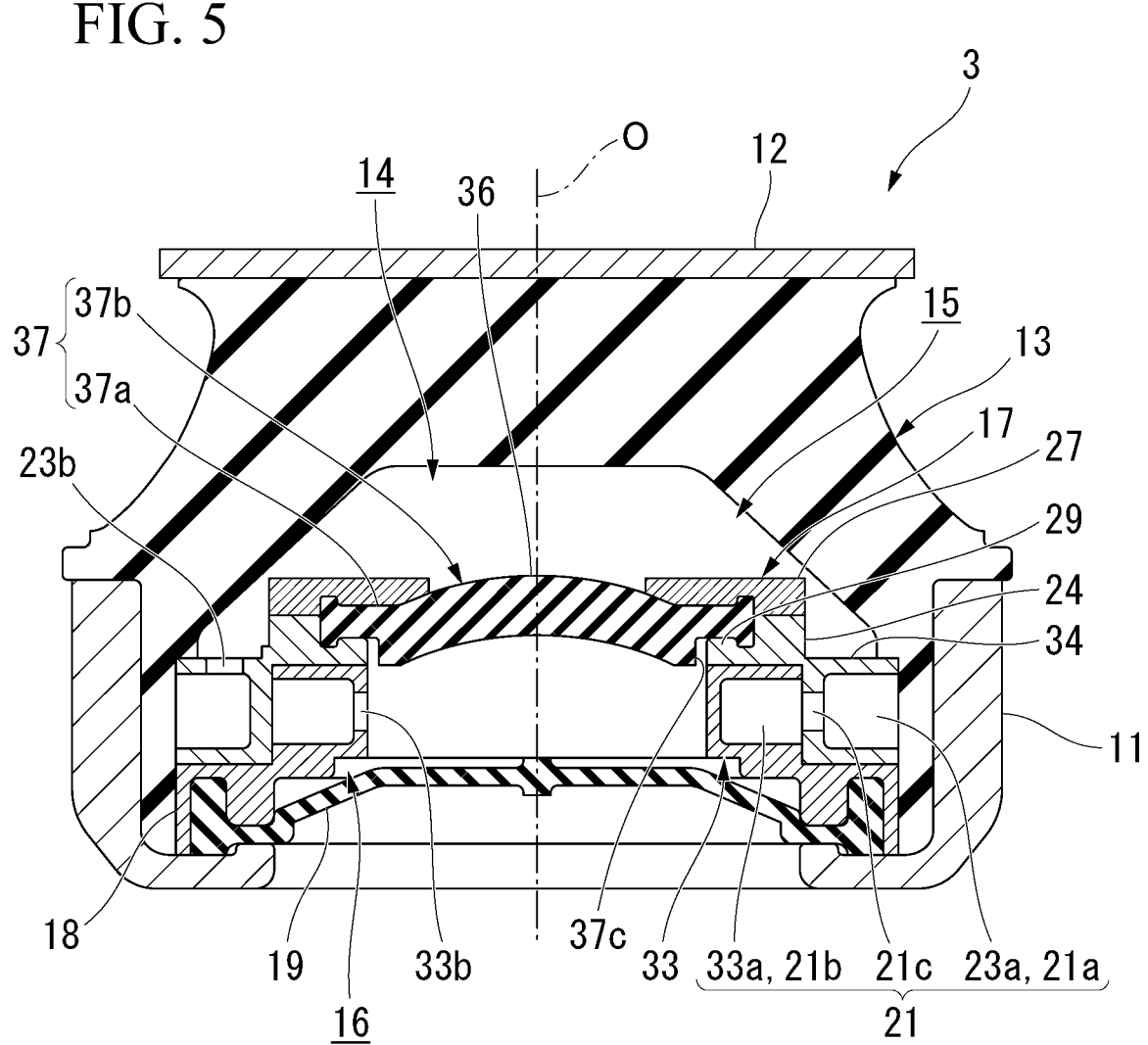
FIG. 5 is a longitudinal sectional view of an anti-vibration device related to a third embodiment of the present invention.
Figure 6:
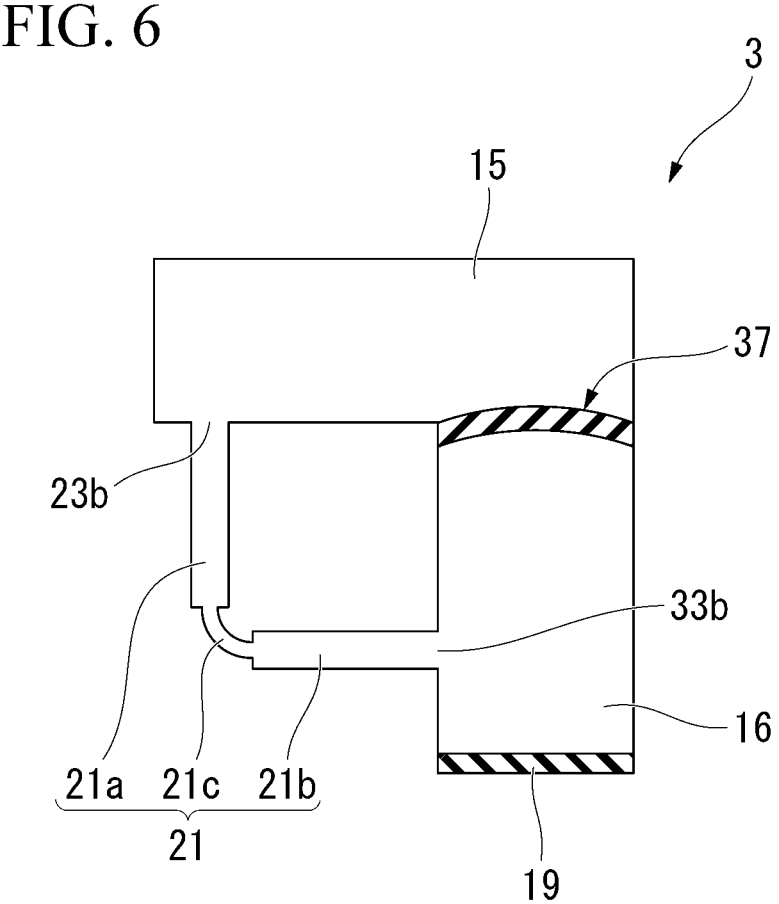
FIG. 6 is a schematic view of the anti-vibration device shown in FIG. 5.

Next, an anti-vibration device 3 related to a third embodiment of the present invention will be described, referring to FIGS. 5 and 6.

In addition, in the third embodiment, the same portions as the constituent elements in the above-described first embodiment will be designated by the same reference signs, and a description thereof will be omitted, and only different points will be described.

In the present embodiment, the support projections 41 are not formed on the first sandwiching part 25. Additionally, the channel cross-sectional shape of the auxiliary liquid chamber-side passage 21b is the aforementioned flat shape, the channel cross-sectional shape of the main liquid chamber-side passage 21a is the square shape, and the ratio in the auxiliary liquid chamber-side passage 21b is larger than the ratio in the main liquid chamber-side passage 21a.

As a result, the main liquid chamber 15 is located on the main liquid chamber-side passage 21a side of which the ratio is smaller out of the main liquid chamber-side passage 21a and the auxiliary liquid chamber-side passage 21b in the flow direction of the liquid in the first orifice passage 21 with respect to the auxiliary liquid chamber 16, and the auxiliary liquid chamber 16 is located on the auxiliary liquid chamber-side passage 21b side of which the ratio is larger out of the main liquid chamber-side passage 21a and the auxiliary liquid chamber-side passage 21b in the flow direction of the liquid in the first orifice passage 21 with respect to the main liquid chamber 15.

An uneven swelling part 36 is formed so as to make the swelling deformation of the membrane 37 toward the auxiliary liquid chamber 16 larger than the swelling deformation of the membrane 37 toward the main liquid chamber 15 when the same pressing force is applied to the membrane 37. In the example shown, the uneven swelling part 36 is curved so as to project toward the main liquid chamber 15.

The membrane 37 includes a disk-shaped body part 37b, and an outer peripheral edge part 37a that is formed to be thinner than the body part 37b, protrudes outward in the radial direction from an upper part of the body part 37b, and continuously extends over the entire circumference.

Moreover, in the present embodiment, the first sandwiching part 27, which protrudes long inward in the radial direction, out of the first sandwiching part 27 and the second sandwiching part 29 supports the upper surface of the membrane 37, and the second sandwiching part 29 supports the lower surface of the membrane 37.

The second sandwiching part 29 is formed integrally with the outer flange part 24 and protrudes inward in the radial direction from the outer flange part 24. Respective lower surfaces of the second sandwiching part 29 and the outer flange part 24 are flush with each other. An upper end opening edge of a peripheral wall part of the lower member 33 abuts respective lower surfaces of the second sandwiching part 29 and the outer flange part 24. An upper surface of the second sandwiching part 29 is located below the upper surface of the outer flange part 24. A lower annular groove, which continuously extends over the entire circumference, is formed at an outer peripheral edge part on the upper surface of the second sandwiching part 29.

Here, the portion of the body part 37b of the membrane 37 located below the outer peripheral edge part 37a is inserted into the second sandwiching part 29. A radial gap is provided between an outer peripheral surface (hereinafter, referred to as an outer peripheral surface 37c of the body part 37b of the membrane 37) of the portion of the body part 37b of the membrane 37 located below the outer peripheral edge part 37a, and an inner peripheral surface of the second sandwiching part 29. The inner peripheral surface of the second sandwiching part 29 and the outer peripheral surface 37c of the body part 37b of the membrane 37 extend in the axial direction, respectively. The inner peripheral surface of the second sandwiching part 29 and the outer peripheral surface 37c of the body part 37b of the membrane 37 are substantially parallel to each other. In addition, the inner peripheral surface of the second sandwiching part 29 and the outer peripheral surface 37c of the body part 37b of the membrane 37 may be inclined with respect to each other.

An outer peripheral part of the first sandwiching part 27 is disposed on the upper surface of the outer flange part 24 and the inner peripheral part thereof supports the upper surface of the membrane 37. An upper annular groove, which continuously extends over the entire circumference, is formed at an outer peripheral edge part on a lower surface of an inner peripheral part of the first sandwiching part 27. The upper annular groove faces a lower annular groove of the second sandwiching part 29 in the axial direction. The locking projections of the outer peripheral edge part 37a of the membrane 37 are separately locked to the upper annular groove and the lower annular groove.

The portion of the first sandwiching part 27 located radially inside the second sandwiching part 29 supports an outer peripheral part on an upper surface of the body part 37b of the membrane 37. A lower surface of an inner peripheral edge part (hereinafter, referred to as an inner peripheral edge part of the first sandwiching part 27) of the inner peripheral part of the first sandwiching part 27, which abuts the membrane 37, is gradually inclined upward so as to be separated from the auxiliary liquid chamber 16 inward in the radial direction. In the example shown, the lower surface of the inner peripheral edge part of the first sandwiching part 27 is formed in a curved surface shape that projects toward the auxiliary liquid chamber 16. In addition, the lower surface of the inner peripheral edge part of the first sandwiching part 27 may be a flat surface that extends in the direction orthogonal to the central axis O.

The upper surface of the membrane 37 abuts the lower surface of the inner peripheral edge part of the first sandwiching part 27. The uneven swelling part 36 of the membrane 37 overhangs to the inside of the first sandwiching part 27. Respective axial positions of an upper end part on an upper surface of the uneven swelling part 36 and an upper surface of the first sandwiching part 27 are the same as each other. The upper surface of the membrane 37 is in non-contact with an inner peripheral surface of the inner peripheral part of the first sandwiching part 27. The membrane 37 abuts the entire lower surface of the inner peripheral part of the first sandwiching part 27, and the entire upper surface of the second sandwiching part 29.

In addition, the upper surface of the membrane 37 may be spaced apart downward from the lower surface of the inner peripheral edge part of the first sandwiching part 27. The uneven swelling part 36 of the membrane 37 may be located below the inner peripheral surface of the inner peripheral part of the first sandwiching part 27. The upper surface of the membrane 37 may be brought into contact with the inner peripheral surface of the inner peripheral part of the first sandwiching part 27.

As described above, according to the anti-vibration device 3 according to the present embodiment, the ratio in the main liquid chamber-side passage 21a is smaller than the ratio in the auxiliary liquid chamber-side passage 21b. Thus, when a rebound load is input, it is possible to generate a large flow velocity difference between a radially inner portion and a radially outer portion in the auxiliary liquid chamber-side passage 21b where the liquid in the auxiliary liquid chamber 16 first flows in and flows therethrough. Accordingly, a large pressure loss can be caused in combination with the fact that the flow direction of the liquid in this case is opposite to the subsequent flow direction of the liquid in the main liquid chamber-side passage 21a. As a result, a high damping force can be generated when a rebound load is input.

On the other hand, when the bound load is input and when the liquid in the main liquid chamber 15 flows through the first orifice passage 21 toward the auxiliary liquid chamber 16, the liquid first flows into the main liquid chamber-side passage 21a and flows therethrough. Thus, the flow velocity of the liquid flowing in the auxiliary liquid chamber-side passage 21b has already decreased in combination with the fact that the flow direction of the liquid in this case is opposite to the subsequent flow direction of the liquid in the auxiliary liquid chamber-side passage 21b. Therefore, in the auxiliary liquid chamber-side passage 21b, a flow velocity difference between the radially inner portion and the radially outer portion is less likely to occur. As a result, the damping force generated when the bound load is input can be suppressed to be lower than the damping force generated when the rebound load is input.

As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Since the uneven swelling part 36 is formed in the membrane 37, when the same pressing force is applied, the amount of swelling deformation of the membrane 37 toward the main liquid chamber 15 is smaller than that toward the auxiliary liquid chamber 16.

Hence, if the bound load is input to the anti-vibration device 3, the damping force to be generated can be suppressed to be low as the membrane 37 is largely swelled and deformed toward the auxiliary liquid chamber 16 by the uneven swelling part 36. On the other hand, if the rebound load is input to the anti-vibration device 3, the swelling deformation of the membrane 37 toward the main liquid chamber 15 becomes smaller than the swelling deformation of the membrane toward the auxiliary liquid chamber 16 when the bound load is input, the negative pressure of the main liquid chamber 15 is not easily relieved, and the damping force to be generated becomes high.

As described above, the ratio of the damping force generated when the rebound load is input to the damping force generated when the bound load is input can be reliably increased.

Additionally, the first sandwiching part 27, which protrudes longer inward in the radial direction than the second sandwiching part 29, supports the membrane 37 from the main liquid chamber 15 side. Thus, when the same pressing force is applied, the amount of swelling deformation of the membrane 37 toward the main liquid chamber 15 is smaller than that toward the auxiliary liquid chamber 16.

That is, if the rebound load is input to the anti-vibration device 3, the swelling deformation of the membrane 37 toward the main liquid chamber 15 is restrained by the first sandwiching part 27, the negative pressure of the main liquid chamber 15 is not easily relieved, and the damping force to be generated becomes high. On the other hand, if the bound load is input to the anti-vibration device 3, the swelling deformation of the membrane 37 toward the auxiliary liquid chamber 16 becomes larger than the swelling deformation of the membrane 37 toward the main liquid chamber 15 when the rebound load is input since the second sandwiching part 29 does not protrude inward in the radial direction from the first sandwiching part 27, and the damping force to be generated can be suppressed to be low.

As described above, the ratio of the damping force generated when the rebound load is input to the damping force generated when the bound load is input can be reliably increased.

Additionally, the radial gap is provided between the outer peripheral surface 37c of the body part 37b of the membrane 37 and the inner peripheral surface of the second sandwiching part 29. Thus, even with the vibration of a relatively small amplitude, when the bound load is input, it is possible to smoothly swell and deform the membrane 37 toward the auxiliary liquid chamber 16, and the damping force to be generated can be reliably suppressed to be low. Additionally, when the membrane 37 tends to be excessively largely swelled and deformed toward the auxiliary liquid chamber 16 at the time of the input of the bound load, the outer peripheral surface 37c of the body part 37b can be made to abut the inner peripheral surface of the second sandwiching part 29, and a large load can be prevented from being applied to the connection portion between the outer peripheral edge part 37a and the body part 37b in the membrane 37.

Additionally, since the uneven swelling part 36 overhangs to the inside of the first sandwiching part 27, a configuration in which the swelling deformation of the membrane 37 toward the auxiliary liquid chamber 16 is made larger than the swelling deformation of the membrane 37 toward the main liquid chamber 15 when the same pressing force is applied can be much more reliably realized.

Figure 7:
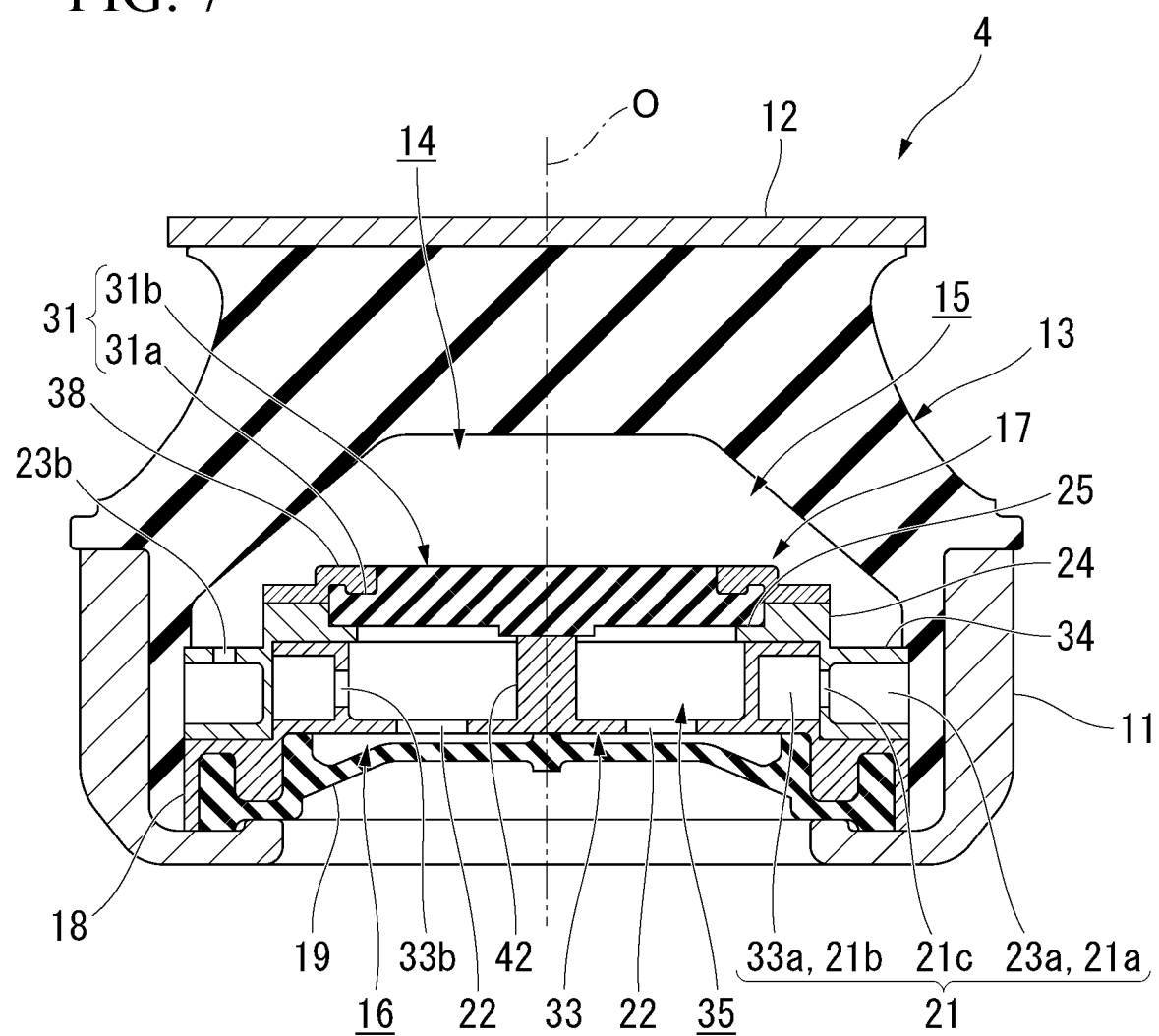
FIG. 7 is a longitudinal sectional view of an anti-vibration device related to a fourth embodiment of the present invention.
Figure 8:
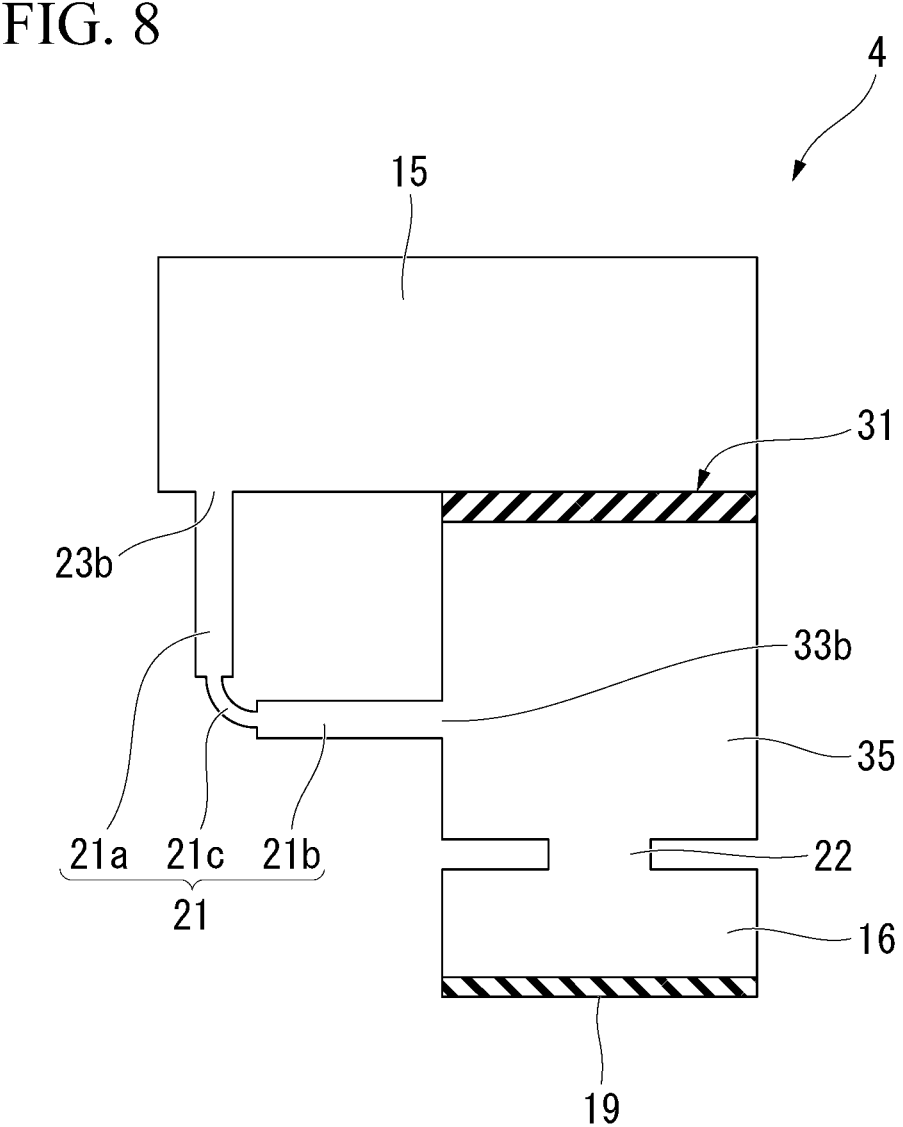
FIG. 8 is a schematic view of the anti-vibration device shown in FIG. 7.

Next, an anti-vibration device 4 related to a fourth embodiment of the present invention will be described, referring to FIGS. 7 and 8.

In addition, in the fourth embodiment, the same portions as the constituent elements in the above-described second embodiment will be designated by the same reference signs, and a description thereof will be omitted, and only differences will be described.

In the present embodiment, the uneven swelling part 23 is not formed in the membrane 31, and an upper surface and a lower surface of the body part 31b are flat. The rigidity of the membrane 31 is equal over the entire membrane 31. The respective inner peripheral surfaces of the first sandwiching part 25 and the second sandwiching part 38 are located at the same position in the radial direction. The restriction projection 26 is not disposed on the lower member 33.

In the present embodiment, a restraining member 42, which restrains swelling deformation of the membrane 31 toward the intermediate liquid chamber 35, is disposed.

In addition, the intermediate liquid chamber 35 is located on the auxiliary liquid chamber-side passage 21b side where the ratio is small out of the main liquid chamber-side passage 21a and the auxiliary liquid chamber-side passage 21b in the flow direction of the liquid in the first orifice passage 21 with respect to the main liquid chamber 15.

The restraining member 42 is disposed in the partition member 17. The restraining member 42 is formed in a columnar shape that is erected upward from the bottom wall part of the lower member 33. An upper end surface of the restraining member 42 is in abutment against or close to the lower surface of the membrane 31. In the example shown, the membrane 31 abuts the upper end surface of the restraining member 42 in a state where an upward pressing force is not applied from the restraining member 42. In this case and in a case where the lower surface of the membrane 31 is close to the upper end surface of the restraining member 42, when the rebound load is input, it is possible to smoothly swell and deform the membrane 31 toward the main liquid chamber 15 with a small force, and an increase in a damping force can be reliably prevented. The restraining member 42 is in abutment or close to a central part of the membrane 31 in the radial direction.

In addition, the restraining member 42 may be formed, for example, in a tubular shape, may abut a portion apart from the central part of the membrane 31 in the radial direction, may be formed in a plate shape that, for example, abuts the entire lower surface of the membrane 31, or may be appropriately changed without being limited to the above embodiment.

The restraining member 42 may be appropriately changed, for example, by being disposed in the first attachment member 11. For example, the restraining member 42 may be formed integrally with the same material as the membrane 31.

The restraining member 42 may abut the membrane 31 in a state where the upward pressing force is applied.

As described above, according to the anti-vibration device 4 related to the present embodiment, the restraining member 42 that restrains the swelling deformation of the membrane 31 toward the intermediate liquid chamber 35 is provided. Thus, when the bound load for causing the liquid to flow from the main liquid chamber 15 toward the auxiliary liquid chamber 16 is input and a positive pressure acts on the main liquid chamber 15, the membrane 31 is restrained from swelled and deformed toward the intermediate liquid chamber 35. Therefore, the positive pressure of the main liquid chamber 15 is not relieved, and a high damping force can be generated.

On the other hand, when the rebound load for causing the liquid to flow from the auxiliary liquid chamber 16 toward the main liquid chamber 15 is input to the anti-vibration device 4, the restraining member 42 does not restrain the deformation of the membrane 31, and the membrane 31 is smoothly swelled and deformed toward the main liquid chamber 15, and thereby, an increase in the damping force is suppressed.

As described above, the ratio of the damping force generated when the bound load is input to the damping force generated when the rebound load is input can be reliably increased.

Moreover, as mentioned above, the swelling deformation of the membrane 31 toward the main liquid chamber 15 is not restrained by the restraining member 42. Thus, even if the main liquid chamber 15 tends to have a negative pressure suddenly with the input of a large rebound load, the membrane 31 is swelled and deformed toward the main liquid chamber 15, and thereby, it is possible to suppress the negative pressure of the main liquid chamber 15, and the occurrence of cavitation can also be suppressed.

In addition, the technical scope of the present invention is not limited to the above embodiments, and various changes can be made without departing from the scope of the present invention defined in claims.

For example, in the first to third embodiments, the uneven swelling part 23 or 36 are formed on the membrane 31 or 37, but the membrane 31 or 37 having no uneven swelling part 23 or 36 may be adopted.

Additionally, in the above first to third embodiments, the first sandwiching part 25 or 27 protrudes longer inward in the radial direction than the second sandwiching part 38 or 29. However, the present invention is not limited to this. For example, the second sandwiching part 38 or 29 may protrude longer inward in the radial direction than the first sandwiching part 25 or 27, or the respective inner peripheral surface of the first sandwiching part 25 or 27 and the second sandwiching part 38 or 29 may be located at the same position in the radial direction.

In the third embodiment, the rigidity of the portion of the membrane 37 that forms a portion of the partition wall of the main liquid chamber 15 may be lower than the rigidity of the portion of the membrane 37 that forms a portion of the partition wall of the auxiliary liquid chamber 16.

In the fourth embodiment, a configuration in which the swelling deformation of the membrane 31 toward the main liquid chamber 15 is restrained may be adopted as the restraining member 42.

Additionally, in the above embodiments, the compression type anti-vibration devices 1 to 4 in which the positive pressure acts on the main liquid chamber 15 as the support load acts have been described. However, it is also applicable to a hanging-type anti-vibration device that is attached such that the main liquid chamber 15 is located on the lower side in a vertical direction and the auxiliary liquid chamber 16 is located on the upper side in the vertical direction and the negative pressure acts on the main liquid chamber 15 as the support load acts.

Additionally, the anti-vibration devices 1 to 4 related to the present invention are not limited to engine mounts of vehicles and is also applicable to those other than the engine mounts. For example, the anti-vibration device is also applicable to mounts of power generators loaded on construction machines or is also applicable to mounts of machines installed in factories or the like.

In addition, it is possible to appropriately substitute the constituent elements in the above-described embodiments with well-known constituent elements without departing from the scope of the present invention defined in the claims. Additionally, the above-described modification examples and respective embodiments may be combined appropriately.

According to the present invention, for example, in the main liquid chamber-side passage, in a case where the ratio of the radial size with respect to the axial size is larger than the ratio in the auxiliary liquid chamber-side passage, when the bound load is input, it is possible to generate a large flow velocity difference between the radially inner portion and the radially outer portion in the main liquid chamber-side passage where the liquid in the main liquid chamber first flows in and flows therethrough. Accordingly, a large pressure loss can be caused in combination with the fact that the flow direction of the liquid in this case is opposite to the subsequent flow direction of the liquid in the auxiliary liquid chamber-side passage. As a result, a high damping force can be generated when the bound load is input.

On the other hand, when the rebound load is input and when the liquid in the auxiliary liquid chamber side flows through the orifice passage toward the main liquid chamber, the liquid first flows into the auxiliary liquid chamber-side passage and flows therethrough. Thus, the flow velocity of the liquid flowing in the main liquid chamber-side passage has already decreased in combination with the fact that the flow direction of the liquid in this case is opposite to the subsequent flow direction of the liquid in the main liquid chamber-side passage. Therefore, in the main liquid chamber-side passage, a flow velocity difference between the radially inner portion and the radially outer portion is less likely to occur. As a result, the damping force generated when the rebound load is input can be suppressed to be lower than the damping force generated when the bound load is input.

As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased.

Contrary to the above, in a case where the ratio in the main liquid chamber-side passage is smaller than the ratio in the auxiliary liquid chamber-side passage, when the rebound load is input, it is possible to generate a large flow velocity difference between the radially inner portion and the radially outer portion in the auxiliary liquid chamber-side passage where the liquid in the auxiliary liquid chamber side first flows in and flows therethrough. Accordingly, a large pressure loss can be caused in combination with the fact that the flow direction of the liquid in this case is opposite to the subsequent flow direction of the liquid in the main liquid chamber-side passage. As a result, a high damping force can be generated when a rebound load is input.

On the other hand, when the bound load is input and when the liquid in the main liquid chamber flows through the orifice passage toward the auxiliary liquid chamber, the liquid first flows into the main liquid chamber-side passage and flows therethrough. Thus, the flow velocity of the liquid flowing in the auxiliary liquid chamber-side passage has already decreased in combination with the fact that the flow direction of the liquid in this case is opposite to the subsequent flow direction of the liquid in the auxiliary liquid chamber-side passage. Therefore, in the auxiliary liquid chamber-side passage, a flow velocity difference between the radially inner portion and the radially outer portion is less likely to occur. As a result, the damping force generated when the bound load is input can be suppressed to be lower than the damping force generated when the rebound load is input.

As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Each of the aforementioned working effects is achieved, for example, by a configuration in which a member that operates when the hydraulic pressure in the main liquid chamber reaches a predetermined value is not adopted, and as described above, for example, the ratio in any one passage out of the main liquid chamber-side passage and the auxiliary liquid chamber-side passages is larger than the ratio in the other passage as mentioned above, and the channel cross-sectional shape of the passage in the one passage is set to the aforementioned flat shape. Therefore, even if the vibration has a relatively small amplitude, the aforementioned working effects can be stably and accurately achieved.

Here, the auxiliary liquid chamber or an intermediate liquid chamber that allows the auxiliary liquid chamber-side passage and the auxiliary liquid chamber to communicate with each other may be disposed opposite to the main liquid chamber with the membrane interposed therebetween in the axial direction, the membrane may be provided with an uneven swelling part that increases, compared to swelling deformation toward any one liquid chamber of the main liquid chamber and the auxiliary liquid chamber or the intermediate liquid chamber, swelling deformation toward the other liquid chamber when the same pressing force is applied, and the one liquid chamber may be located on the other passage side of which the ratio is smaller out of the main liquid chamber-side passage and the auxiliary liquid chamber-side passage in a flow direction of the liquid in the orifice passage.

In this case, the uneven swelling part is formed in the membrane. Thus, when the same pressing force is applied, the swelling deformation of the membrane toward any one liquid chamber of the main liquid chamber and the auxiliary liquid chamber or the intermediate liquid chamber becomes smaller than the swelling deformation of the membrane toward the other liquid chamber side.

Hereinafter, the auxiliary liquid chamber or the intermediate liquid chamber located opposite to the main liquid chamber with the membrane interposed therebetween is referred to as the opposite liquid chamber.

Specifically, in a case where the ratio in the auxiliary liquid chamber-side passage is lower than the ratio in the main liquid chamber-side passage, when the same pressing force is applied, the amount of swelling deformation of the membrane toward the opposite liquid chamber is smaller than that toward the main liquid chamber.

Hence, if the rebound load is input to the anti-vibration device, the damping force to be generated can be suppressed to be low as the membrane is largely swelled and deformed toward the main liquid chamber by the uneven swelling part. On the other hand, if the bound load is input to the anti-vibration device, the swelling deformation of the membrane on the opposite liquid chamber side becomes smaller than the swelling deformation of the membrane toward the main liquid chamber when the rebound load is input, the positive pressure of the main liquid chamber is not easily relieved, and the damping force to be generated becomes high.

Moreover, even if the main liquid chamber tends to have a negative pressure suddenly with the input of a large rebound load, the membrane is largely swelled and deformed toward the main liquid chamber by the uneven swelling part, and thereby, the negative pressure of the main liquid chamber can be suppressed. Therefore, the occurrence of cavitation can also be suppressed.

As described above, the ratio of the damping force generated when the bound load is input to the damping force generated when the rebound load is input can be reliably increased.

Contrary to the above, a case is considered where the ratio in the main liquid chamber-side passage is lower than the ratio in the auxiliary liquid chamber-side passage. Since the uneven swelling part is formed in the membrane, when the same pressing force is applied, the amount of swelling deformation of the membrane toward the main liquid chamber is smaller than that toward the opposite liquid chamber.

Hence, if the bound load is input to the anti-vibration device, the damping force to be generated can be suppressed to be low as the membrane is largely swelled and deformed toward the opposite liquid chamber by the uneven swelling part. On the other hand, if the rebound load is input to the anti-vibration device, the swelling deformation of the membrane toward the main liquid chamber becomes smaller than the swelling deformation of the membrane toward the opposite liquid chamber when the bound load is input, the negative pressure of the main liquid chamber is not easily relieved, and the damping force to be generated becomes high.

As described above, the ratio of the damping force generated when the rebound load is input to the damping force generated when the bound load is input can be reliably increased.

Additionally, the uneven swelling part may be curved so as to project toward the one liquid chamber.

In this case, a configuration in which, when the same pressing force is applied to the membrane, the swelling deformation of the membrane toward one liquid chamber of the main liquid chamber and the opposite liquid chamber is smaller than the swelling deformation of the membrane toward any other liquid chamber can be easily and reliably realized.

Additionally, a first sandwiching part and a second sandwiching part that sandwich an outer peripheral edge part of the membrane from both sides in the axial direction may be provided, and the uneven swelling part may be integrally formed over an entire region of a portion of the membrane located radially inside the outer peripheral edge part.

In this case, since the uneven swelling part is integrally formed over the entire region of the portion of the membrane located radially inside the outer peripheral edge part, it is possible to largely swell and deform the membrane toward the other liquid chamber, and the damping force generated when the bound load is input and the damping force generated when the rebound load is input can be made greatly different from each other.

Additionally, the auxiliary liquid chamber or an intermediate liquid chamber that allows the auxiliary liquid chamber-side passage and the auxiliary liquid chamber to communicate with each other may be disposed opposite to the main liquid chamber with the membrane interposed therebetween in the axial direction, a first sandwiching part and a second sandwiching part that sandwich an outer peripheral edge part of the membrane from both sides in the axial direction may be provided, the first sandwiching part supports the membrane from one liquid chamber side that is located on the other passage side in a flow direction of the liquid in the orifice passage out of the main liquid chamber, and the auxiliary liquid chamber or the intermediate liquid chamber, the second sandwiching part may support the membrane from the other liquid chamber side that is located on the one passage side in the flow direction of the liquid in the orifice passage out of the main liquid chamber, and the auxiliary liquid chamber or the intermediate liquid chamber, and the first sandwiching part may protrude to be longer inward in the radial direction than the second sandwiching part.

In this case, the first sandwiching part, which protrudes long inward in the radial direction, out of the first sandwiching part and the second sandwiching part supports the membrane from one liquid chamber side, and the second sandwiching part supports the membrane from the other liquid chamber side. Thus, when the same pressing force is applied, the amount of swelling deformation of the membrane toward the one liquid chamber is smaller than that toward the other liquid chamber.

Hereinafter, the auxiliary liquid chamber or the intermediate liquid chamber located opposite to the main liquid chamber with the membrane interposed therebetween is referred to as the opposite liquid chamber.

Specifically, in a case where the ratio in the auxiliary liquid chamber-side passage is smaller than the ratio in the main liquid chamber-side passage, the first sandwiching part, which protrudes longer inward in the radial direction than the second sandwiching part, supports the membrane from the opposite liquid chamber side. Thus, when the same pressing force is applied, the amount of swelling deformation of the membrane toward the opposite liquid chamber is smaller than that toward the main liquid chamber.

That is, if the bound load is input to the anti-vibration device, the swelling deformation of the membrane toward the opposite liquid chamber is restrained by the first sandwiching part, the positive pressure of the main liquid chamber is not easily relieved, and the damping force to be generated becomes high. On the other hand, if the rebound load is input to the anti-vibration device, the swelling deformation of the membrane toward the main liquid chamber becomes larger than the swelling deformation of the membrane toward the opposite liquid chamber when the bound load is input since the second sandwiching part does not protrude inward in the radial direction from the first sandwiching part, and the damping force to be generated can be suppressed to be low.

As described above, the ratio of the damping force generated when the bound load is input to the damping force generated when the rebound load is input can be reliably increased.

Moreover, as mentioned above, the membrane is more easily swelled and deformed toward the main liquid chamber than toward the opposite liquid chamber. Thus, even if the main liquid chamber tends to have a negative pressure suddenly with the input of a large rebound load, the membrane is swelled and deformed toward the main liquid chamber, and thereby, it is possible to suppress the negative pressure of the main liquid chamber, and the occurrence of cavitation can also be suppressed.

Contrary to the above, in a case where the ratio in the main liquid chamber-side passage is smaller than the ratio in the auxiliary liquid chamber-side passage, the first sandwiching part, which protrudes longer inward in the radial direction than the second sandwiching part, supports the membrane from the main liquid chamber side. Thus, when the same pressing force is applied, the amount of swelling deformation of the membrane toward the main liquid chamber is smaller than that toward the opposite liquid chamber.

That is, if the rebound load is input to the anti-vibration device, the swelling deformation of the membrane toward the main liquid chamber is restrained by the first sandwiching part, the negative pressure of the main liquid chamber is not easily relieved, and the damping force to be generated becomes high. On the other hand, if the bound load is input to the anti-vibration device, the swelling deformation of the membrane toward the opposite liquid chamber becomes larger than the swelling deformation of the membrane toward the main liquid chamber when the rebound load is input since the second sandwiching part does not protrude inward in the radial direction from the first sandwiching part, and the damping force to be generated can be suppressed to be low.

As described above, the ratio of the damping force generated when the rebound load is input to the damping force generated when the bound load is input can be reliably increased.

Additionally, at least one of the first sandwiching part and the outer peripheral edge part of the membrane may be provided with a plurality of support projections that protrude toward and abuts the other.

In this case, at least one of the first sandwiching part and the outer peripheral edge part of the membrane is formed with the plurality of support projections that protrude toward and abuts the other. Thus, when a load is input to the anti-vibration device and the membrane is deformed or displaced toward the one liquid chamber, it is possible to inhibit the outer peripheral edge part of the membrane from colliding against the first sandwiching part all at once over a wide range, and the striking sound to be generated can be suppressed to be small.

Additionally, the membrane may include an outer peripheral edge part that is sandwiched by the first sandwiching part and the second sandwiching part, and a body part that is located radially inside the outer peripheral edge part and is formed to be thick, and a radial gap may be provided between an outer peripheral surface of a portion of the body part located closer to the other liquid chamber than the outer peripheral edge part, and an inner peripheral surface of the second sandwiching part.

In this case, the radial gap is provided between the outer peripheral surface of the body part of the membrane and the inner peripheral surface of the second sandwiching part. Thus, even with the vibration of a relatively small amplitude, it is possible to smoothly swell and deform the membrane toward the other liquid chamber, and the damping force to be generated can be reliably suppressed to be low. Additionally, when the membrane tends to be excessively largely swelled and deformed toward the other liquid chamber, the outer peripheral surface of the body part can be made to abut the inner peripheral surface of the second sandwiching part, and a large load can be prevented from being applied to the connection portion between the outer peripheral edge part and the body part in the membrane.

Additionally, the auxiliary liquid chamber or an intermediate liquid chamber that allows the auxiliary liquid chamber-side passage and the auxiliary liquid chamber to communicate with each other may be disposed opposite to the main liquid chamber with the membrane interposed therebetween in the axial direction, a rigidity of a portion of the membrane that forms a portion of the partition wall of any one liquid chamber of the main liquid chamber, and the auxiliary liquid chamber or the intermediate liquid chamber may be lower than a rigidity of a portion of the membrane that forms a portion of the partition wall of the other liquid chamber, and the one liquid chamber may be located on the other passage side of which the ratio is smaller out of the main liquid chamber-side passage and the auxiliary liquid chamber-side passage in a flow direction of the liquid in the orifice passage.

Hereinafter, the auxiliary liquid chamber or the intermediate liquid chamber located opposite to the main liquid chamber with the membrane interposed therebetween is referred to as the opposite liquid chamber.

In a case where the ratio in the auxiliary liquid chamber-side passage is smaller than the ratio in the main liquid chamber-side passage, the rigidity of the portion of the membrane that forms a portion of the partition wall of the opposite liquid chamber is lower than the rigidity of the portion of the membrane that forms a portion of the partition wall of the main liquid chamber. As a result, when the same pressing force is applied, the amount of swelling deformation of the membrane toward the main liquid chamber is larger than that toward the opposite liquid chamber.

Hence, if the rebound load is input to the anti-vibration device, the damping force to be generated can be suppressed to be low as the membrane is largely swelled and deformed toward the main liquid chamber. On the other hand, if the bound load is input to the anti-vibration device, the swelling deformation of the membrane on the opposite liquid chamber side becomes smaller than the swelling deformation of the membrane toward the main liquid chamber when the rebound load is input, the positive pressure of the main liquid chamber is not easily relieved, and the damping force to be generated becomes high.

As described above, the ratio of the damping force generated when the bound load is input to the damping force generated when the rebound load is input can be reliably increased.

Moreover, the rigidity of the portion of the membrane, which forms a portion of the partition wall of the opposite liquid chamber, is lower than the rigidity of the portion of the membrane that forms a portion of the partition wall of the main liquid chamber. Therefore, when the main liquid chamber tends to have a negative pressure suddenly with the input of a large rebound load, it is possible to smoothly swell and deform the membrane toward the main liquid chamber, and the negative pressure of the main liquid chamber can be suppressed, and occurrence of cavitation can be suppressed.

Contrary to the above, in a case where the ratio in the main liquid chamber-side passage is smaller than the ratio in the auxiliary liquid chamber-side passage, the rigidity of the portion of the membrane, which forms a portion of a partition wall of the main liquid chamber, is lower than the rigidity of the portion of the membrane that forms a portion the partition wall of the opposite liquid chamber. As a result, when the same pressing force is applied, the amount of swelling deformation of the membrane toward the opposite liquid chamber is larger than that toward the main liquid chamber.

Hence, if the bound load is input to the anti-vibration device, the damping force to be generated can be suppressed to be low as the membrane is largely swelled and deformed toward the opposite liquid chamber. On the other hand, if the rebound load is input to the anti-vibration device, the swelling deformation of the membrane toward the main liquid chamber becomes smaller than the swelling deformation of the membrane toward the opposite liquid chamber when the bound load is input, the negative pressure of the main liquid chamber is not easily relieved, and the damping force to be generated becomes high.

As described above, the ratio of the damping force generated when the rebound load is input to the damping force generated when the bound load is input can be reliably increased.

Additionally, the auxiliary liquid chamber or an intermediate liquid chamber that allows the auxiliary liquid chamber-side passage and the auxiliary liquid chamber to communicate with each other may be disposed opposite to the main liquid chamber with the membrane interposed therebetween in the axial direction, the restraining member that restrains the swelling deformation of the membrane toward any one liquid chamber of the main liquid chamber, and the auxiliary liquid chamber or the intermediate liquid chamber is provided, and the one liquid chamber may be located on the other passage side of which the ratio is smaller out of the main liquid chamber-side passage and the auxiliary liquid chamber-side passage in a flow direction of the liquid in the orifice passage.

Hereinafter, the auxiliary liquid chamber or the intermediate liquid chamber located opposite to the main liquid chamber with the membrane interposed therebetween is referred to as the opposite liquid chamber.

In a case where the ratio in the auxiliary liquid chamber-side passage is smaller than the ratio in the main liquid chamber-side passage, the restraining member restrains the swelling deformation of the membrane toward the opposite liquid chamber.

Therefore, if the bound load is input to the anti-vibration device, the swelling deformation of the membrane toward the opposite liquid chamber is restrained by the restraining member, the positive pressure of the main liquid chamber is not easily relieved, and the damping force to be generated is high. On the other hand, when the rebound load is input to the anti-vibration device, the restraining member does not restrain the deformation of the membrane, and the membrane is smoothly swelled and deformed toward the main liquid chamber, and thereby, an increase in the damping force is suppressed.

As described above, the ratio of the damping force generated when the bound load is input to the damping force generated when the rebound load is input can be reliably increased.

Moreover, as mentioned above, the swelling deformation of the membrane toward the main liquid chamber is not restrained by the restraining member. Thus, even if the main liquid chamber tends to have a negative pressure suddenly with the input of a large rebound load, the membrane is swelled and deformed toward the main liquid chamber, and thereby, it is possible to suppress the negative pressure of the main liquid chamber, and the occurrence of cavitation can also be suppressed.

Contrary to the above, in a case where the ratio in the main liquid chamber-side passage is smaller than the ratio in the auxiliary liquid chamber-side passage, the restraining member restrains the swelling deformation of the membrane toward the main liquid chamber.

Therefore, if the rebound load is input to the anti-vibration device, the swelling deformation of the membrane toward the main liquid chamber is restrained by the restraining member, the negative pressure of the main liquid chamber is not easily relieved, and the damping force to be generated is high. On the other hand, when the bound load is input to the anti-vibration device, the restraining member does not restrain the deformation of the membrane, and the membrane is smoothly swelled and deformed toward the opposite liquid chamber, and thereby, an increase in the damping force is suppressed.

As described above, the ratio of the damping force generated when the rebound load is input to the damping force generated when the bound load is input can be reliably increased.

Additionally, the ratio of the radial size to the axial size in the one passage may be 1.3 or more.

In this case, since the ratio in the one passage is 1.3 or more, each of the aforementioned working effects is reliably achieved.

INDUSTRIAL APPLICABILITY

By applying the anti-vibration device of the present application to the relevant field, the damping force generated when the bound load is input and the damping force generated when the rebound load is input can be made different from each other.

REFERENCE SIGNS LIST 1, 2, 3, 4: anti-vibration device
11: First attachment member
12: Second attachment member
13: Elastic body
14: Liquid chamber
15: Main liquid chamber
16: Auxiliary liquid chamber
17: partition member
21: First orifice passage (orifice passage)
21a: Main liquid chamber-side passage
21b: Auxiliary liquid chamber-side passage
23, 36: Uneven swelling part
31, 37: Membrane
31a, 37a: Outer peripheral edge part
35: Intermediate liquid chamber
41: Support projection
42: Restraining member

The invention claimed is:

1. An anti-vibration device comprising:
a tubular first attachment member that is coupled to any one of a vibration generating part and a vibration receiving part, and a second attachment member that is coupled to the other thereof;
an elastic body that couples the first attachment member and the second attachment member to each other; and
a partition member that partitions a liquid chamber in the first attachment member into a main liquid chamber having the elastic body in a portion of a partition wall thereof, and an auxiliary liquid chamber,
wherein the partition member includes
a membrane that forms a portion of the partition wall of the main liquid chamber, and
an orifice passage that extends from the main liquid chamber toward the auxiliary liquid chamber,
the orifice passage includes a main liquid chamber-side passage that is located on the main liquid chamber side and an auxiliary liquid chamber-side passage that extends from the main liquid chamber-side passage toward the auxiliary liquid chamber,
the main liquid chamber-side passage and the auxiliary liquid chamber-side passage extend in a circumferential direction and are disposed at mutually different radial positions,
a flow direction in the main liquid chamber-side passage and a flow direction in the auxiliary liquid chamber-side passage are opposite to each other when liquid flows through the orifice passage,
a channel cross-sectional shape in at least one passage of the main liquid chamber-side passage and the auxiliary liquid chamber-side passage is formed such that an axial size measured in an axial direction along a central axis of the first attachment member, and
a ratio of the radial size to the axial size in the one passage is larger than the ratio in the other passage of the main liquid chamber-side passage and the auxiliary liquid chamber-side passage.

2. The anti-vibration device according to claim 1, wherein the auxiliary liquid chamber or an intermediate liquid chamber that allows the auxiliary liquid chamber-side passage and the auxiliary liquid chamber to communicate with each other is disposed opposite to the main liquid chamber with the membrane interposed therebetween in the axial direction,
the membrane is provided with an uneven swelling part that increases, compared to swelling deformation toward any one liquid chamber of the main liquid chamber and the auxiliary liquid chamber or the intermediate liquid chamber, swelling deformation toward the other liquid chamber when a same pressing force is applied, and
the one liquid chamber is located on a side of the other passage of which the ratio is smaller out of the main liquid chamber-side passage and the auxiliary liquid chamber-side passage in a flow direction of the liquid in the orifice passage.

3. The anti-vibration device according to claim 2, wherein the uneven swelling part is curved so as to project toward the one liquid chamber.

4. The anti-vibration device according to claim 2, further comprising:
a first sandwiching part and a second sandwiching part that sandwich an outer peripheral edge part of the membrane from both sides in the axial direction, and
the uneven swelling part is integrally formed over an entire region of a portion of the membrane located radially inside the outer peripheral edge part.

5. The anti-vibration device according to claim 1,
wherein the auxiliary liquid chamber or an intermediate liquid chamber that allows the auxiliary liquid chamber-side passage and the auxiliary liquid chamber to communicate with each other is disposed opposite to the main liquid chamber with the membrane interposed therebetween in the axial direction,
a first sandwiching part and a second sandwiching part that sandwich an outer peripheral edge part of the membrane from both sides in the axial direction are provided,
the first sandwiching part supports the membrane from a side of the one liquid chamber that is located on a side of the other passage in a flow direction of the liquid in the orifice passage out of the main liquid chamber, and the auxiliary liquid chamber or the intermediate liquid chamber, the second sandwiching part supports the membrane from a side of the other liquid chamber that is located on a side of the one passage in the flow direction of the liquid in the orifice passage out of the main liquid chamber, and the auxiliary liquid chamber or the intermediate liquid chamber, and the first sandwiching part protrudes further inward in the radial direction from the second sandwiching part.

6. The anti-vibration device according to claim 5, wherein at least one of the first sandwiching part and the outer peripheral edge part of the membrane is provided with a plurality of support projections that protrude toward and abut the other thereof.

7. The anti-vibration device according to claim 5, wherein the membrane includes an outer peripheral edge part that is sandwiched between the first sandwiching part and the second sandwiching part, and a body part that is located radially inside the outer peripheral edge part and formed thicker than the outer peripheral edge part, and a radial gap is provided between an outer peripheral surface of a portion of the body part located closer to the other liquid chamber than the outer peripheral edge part and an inner peripheral surface of the second sandwiching part.

8. The anti-vibration device according to claim 1, wherein the auxiliary liquid chamber or an intermediate liquid chamber that allows the auxiliary liquid chamber-side passage and the auxiliary liquid chamber to communicate with each other is disposed opposite to the main liquid chamber with the membrane interposed therebetween in the axial direction, a rigidity of a portion of the membrane that forms a portion of the partition wall of any one liquid chamber of the main liquid chamber, and the auxiliary liquid chamber or the intermediate liquid chamber is lower than a rigidity of a portion of the membrane that forms a portion of the partition wall of the other liquid chamber, and the one liquid chamber is located on a side of the other passage of which the ratio is smaller out of the main liquid chamber-side passage and the auxiliary liquid chamber-side passage in a flow direction of the liquid in the orifice passage.

9. The anti-vibration device according to claim 1, wherein the auxiliary liquid chamber or an intermediate liquid chamber that allows the auxiliary liquid chamber-side passage and the auxiliary liquid chamber to communicate with each other is disposed opposite to the main liquid chamber with the membrane interposed therebetween in the axial direction, a restraining member that restrains a swelling deformation of the membrane toward any one liquid chamber of the main liquid chamber, and the auxiliary liquid chamber or the intermediate liquid chamber is provided, and the one liquid chamber is located on a side of the other passage of which the ratio is smaller out of the main liquid chamber-side passage and the auxiliary liquid chamber-side passage in a flow direction of the liquid in the orifice passage.

10. The anti-vibration device according to claim 1, wherein the ratio of the radial size to the axial size in the one passage is 1.3 or more.

11. The anti-vibration device according to claim 2, wherein the auxiliary liquid chamber or the intermediate liquid chamber that allows the auxiliary liquid chamber-side passage and the auxiliary liquid chamber to communicate with each other is disposed opposite to the main liquid chamber with the membrane interposed therebetween in the axial direction, a first sandwiching part and a second sandwiching part that sandwich an outer peripheral edge part of the membrane from both sides in the axial direction are provided, the first sandwiching part supports the membrane from a side of the one liquid chamber that is located on the side of the other passage in a flow direction of the liquid in the orifice passage out of the main liquid chamber, and the auxiliary liquid chamber or the intermediate liquid chamber, the second sandwiching part supports the membrane from a side of the other liquid chamber that is located on a side of the one passage in the flow direction of the liquid in the orifice passage out of the main liquid chamber, and the auxiliary liquid chamber or the intermediate liquid chamber, and the first sandwiching part protrudes further inward in the radial direction from the second sandwiching part.

12. The anti-vibration device according to claim 2, wherein the auxiliary liquid chamber or the intermediate liquid chamber that allows the auxiliary liquid chamber-side passage and the auxiliary liquid chamber to communicate with each other is disposed opposite to the main liquid chamber with the membrane interposed therebetween in the axial direction, a rigidity of a portion of the membrane that forms a portion of the partition wall of any one liquid chamber of the main liquid chamber, and the auxiliary liquid chamber or the intermediate liquid chamber is lower than a rigidity of a portion of the membrane that forms a portion of the partition wall of the other liquid chamber, and the one liquid chamber is located on the side of the other passage of which the ratio is smaller out of the main liquid chamber-side passage and the auxiliary liquid chamber-side passage in a flow direction of the liquid in the orifice passage.

13. The anti-vibration device according to claim 2, wherein the auxiliary liquid chamber or the intermediate liquid chamber that allows the auxiliary liquid chamber-side passage and the auxiliary liquid chamber to communicate with each other is disposed opposite to the main liquid chamber with the membrane interposed therebetween in the axial direction, a restraining member that restrains a swelling deformation of the membrane toward any one liquid chamber of the main liquid chamber, and the auxiliary liquid chamber or the intermediate liquid chamber is provided, and the one liquid chamber is located on the side of the other passage of which the ratio is smaller out of the main liquid chamber-side passage and the auxiliary liquid chamber-side passage in a flow direction of the liquid in the orifice passage.

14. The anti-vibration device according to claim 2, wherein the ratio of the radial size to the axial size in the one passage is 1.3 or more.

15. The anti-vibration device according to claim 3, further comprising:
- a first sandwiching part and a second sandwiching part that sandwich an outer peripheral edge part of the membrane from both sides in the axial direction, and
- the uneven swelling part is integrally formed over an entire region of a portion of the membrane located radially inside the outer peripheral edge part.

16. The anti-vibration device according to claim 3,
- wherein the auxiliary liquid chamber or the intermediate liquid chamber that allows the auxiliary liquid chamber-side passage and the auxiliary liquid chamber to communicate with each other is disposed opposite to the main liquid chamber with the membrane interposed therebetween in the axial direction,
- a first sandwiching part and a second sandwiching part that sandwich an outer peripheral edge part of the membrane from both sides in the axial direction are provided,
- the first sandwiching part supports the membrane from a side of the one liquid chamber that is located on the side of the other passage in a flow direction of the liquid in the orifice passage out of the main liquid chamber, and the auxiliary liquid chamber or the intermediate liquid chamber,
- the second sandwiching part supports the membrane from a side of the other liquid chamber that is located on a side of the one passage in the flow direction of the liquid in the orifice passage out of the main liquid chamber, and the auxiliary liquid chamber or the intermediate liquid chamber, and
- the first sandwiching part protrudes further inward in the radial direction from the second sandwiching part.

17. The anti-vibration device according to claim 3,
- wherein the auxiliary liquid chamber or the intermediate liquid chamber that allows the auxiliary liquid chamber-side passage and the auxiliary liquid chamber to communicate with each other is disposed opposite to the main liquid chamber with the membrane interposed therebetween in the axial direction,
- a rigidity of a portion of the membrane that forms a portion of the partition wall of any one liquid chamber of the main liquid chamber, and the auxiliary liquid chamber or the intermediate liquid chamber is lower than a rigidity of a portion of the membrane that forms a portion of the partition wall of the other liquid chamber, and
- the one liquid chamber is located on the side of the other passage of which the ratio is smaller out of the main liquid chamber-side passage and the auxiliary liquid chamber-side passage in a flow direction of the liquid in the orifice passage.

18. The anti-vibration device according to claim 3,
- wherein the auxiliary liquid chamber or the intermediate liquid chamber that allows the auxiliary liquid chamber-side passage and the auxiliary liquid chamber to communicate with each other is disposed opposite to the main liquid chamber with the membrane interposed therebetween in the axial direction,
- a restraining member that restrains a swelling deformation of the membrane toward any one liquid chamber of the main liquid chamber, and the auxiliary liquid chamber or the intermediate liquid chamber is provided, and
- the one liquid chamber is located on the side of the other passage of which the ratio is smaller out of the main liquid chamber-side passage and the auxiliary liquid chamber-side passage in a flow direction of the liquid in the orifice passage.

19. The anti-vibration device according to claim 3,
- wherein the ratio of the radial size to the axial size in the one passage is 1.3 or more.

20. The anti-vibration device according to claim 4,
- wherein the auxiliary liquid chamber or the intermediate liquid chamber that allows the auxiliary liquid chamber-side passage and the auxiliary liquid chamber to communicate with each other is disposed opposite to the main liquid chamber with the membrane interposed therebetween in the axial direction,
- a first sandwiching part and a second sandwiching part that sandwich an outer peripheral edge part of the membrane from both sides in the axial direction are provided,
- the first sandwiching part supports the membrane from a side of the one liquid chamber that is located on the side of the other passage in a flow direction of the liquid in the orifice passage out of the main liquid chamber, and the auxiliary liquid chamber or the intermediate liquid chamber,
- the second sandwiching part supports the membrane from a side of the other liquid chamber that is located on a side of the one passage in the flow direction of the liquid in the orifice passage out of the main liquid chamber, and the auxiliary liquid chamber or the intermediate liquid chamber, and
- the first sandwiching part protrudes further inward in the radial direction from the second sandwiching part.

* * * * *